US012659987B2

(12) United States Patent
Li et al.

(10) Patent No.: US 12,659,987 B2
(45) Date of Patent: Jun. 16, 2026

(54) RANDOM ACCESS METHOD AND APPARATUS AND RESOURCE CONFIGURATION METHOD AND APPARATUS

(71) Applicant: 1FINITY Inc., Kawasaki (JP)

(72) Inventors: Guorong Li, Beijing (CN); Pengyu Ji, Beijing (CN); Jian Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 743 days.

(21) Appl. No.: 17/955,932

(22) Filed: Sep. 29, 2022

(65) Prior Publication Data

US 2023/0024143 A1     Jan. 26, 2023

Related U.S. Application Data

(63) Continuation of application No. PCT/CN2020/084062, filed on Apr. 9, 2020.

(51) Int. Cl.
| | |
|---|---|
| *H04W 74/04* | (2009.01) |
| *H04W 72/1263* | (2023.01) |
| *H04W 72/54* | (2023.01) |
| *H04W 74/0833* | (2024.01) |
| *H04W 74/0836* | (2024.01) |

(52) U.S. Cl.
CPC ....... *H04W 74/04* (2013.01); *H04W 72/1263* (2013.01); *H04W 72/54* (2023.01);
(Continued)

(58) Field of Classification Search
CPC . H04W 74/04; H04W 72/54; H04W 72/1263; H04W 74/0841; H04W 74/0836; H04W 74/0833
See application file for complete search history.

(56) References Cited

U.S. PATENT DOCUMENTS

2016/0270114 A1* 9/2016 Dinan ................... H04L 5/0091
2019/0166623 A1   5/2019 Wei et al.
(Continued)

FOREIGN PATENT DOCUMENTS

| | | |
|---|---|---|
| CN | 107347215 A | 11/2017 |
| CN | 110830955 A | 2/2020 |

(Continued)

OTHER PUBLICATIONS

First Notification of Office Action and Search Report issued by the China National Intellectual Property Administration for corresponding Chinese Patent Application No. 202080099329.1, mailed on Dec. 2, 2024, with an English translation.
(Continued)

*Primary Examiner* — Tonia L Dollinger
(74) *Attorney, Agent, or Firm* — Myers Wolin, LLC

(57) ABSTRACT

A random access method and apparatus and resource configuration method and apparatus. The random access apparatus includes: a third receiving unit configured to, on a physical random access channel resource, receive a random access preamble transmitted by a terminal equipment; wherein the random access preamble is used to indicate that the terminal equipment has sidelink data to be transmitted, and/or the physical random access channel resource is used to indicate that the terminal equipment has sidelink data to be transmitted; and a second transmitting unit configured to transmit a random access response to the terminal equipment. By indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

8 Claims, 12 Drawing Sheets

1601 a scheduling request is triggered, when a terminal equipment has sidelink data to be transmitted and there exists no currently available sidelink resource

1602 the terminal equipment transmits a scheduling request to a network device

1603 transmitting the scheduling request is stopped or the scheduling request is cancelled when transmission of the scheduling request exceeds maximum time latency of the sidelink data

(52) U.S. Cl.
CPC .... *H04W 74/0841* (2013.01); *H04W 74/0833* (2013.01); *H04W 74/0836* (2024.01)

(56) References Cited

U.S. PATENT DOCUMENTS

| | | | |
|---|---|---|---|
| 2020/0029353 A1* | 1/2020 | Xu ........................ | H04W 72/21 |
| 2021/0014723 A1* | 1/2021 | Feuersaenger ...... | H04W 72/543 |
| 2021/0258989 A1 | 8/2021 | Zhang et al. | |
| 2021/0298034 A1* | 9/2021 | He ........................ | H04W 72/12 |
| 2022/0183030 A1* | 6/2022 | Lee ........................ | H04L 5/0053 |

FOREIGN PATENT DOCUMENTS

| | | |
|---|---|---|
| CN | 110972101 A | 4/2020 |
| WO | 2017/051381 A1 | 3/2017 |

OTHER PUBLICATIONS

International Search Report and Written Opinion of the International Searching Authority issued by the China National Intellectual Property Administration for corresponding International Patent Application No. PCT/CN2020/084062, mailed on Jan. 14, 2021, with an English translation.

Notice of Reasons for Refusal issued by the Japan Patent Office for corresponding Japanese Patent Application No. 2022-559758, mailed on Oct. 10, 2023, with an English translation.

Huawei et al., "Further discussion on the Sidelink CSI reporting related issues", Agenda Item: 6.4.3.1, 3GPP TSG-RAN WG2 Meeting #109 electronic, R2-2000711, Feb. 24-Mar. 6, 2020.

Notice of Reasons for Refusal issued by the Japan Patent Office for corresponding Japanese Patent Application No. 2022-559758, mailed on Mar. 19, 2024, with an English translation.

LG Electronics Inc., "Introduction of 5G V2X with NR Sidelink", Work Item Code: 5G_V2X_NRSL, Change Request, 3GPP TSG-RAN WG2 #109-e, R2-2002316, Online, Feb. 24-Mar. 6, 2020.

Second Notification of Office Action issued by the China National Intellectual Property Administration for corresponding Chinese Patent Application No. 202080099329.1, mailed on Jul. 16, 2025, with an English translation.

* cited by examiner

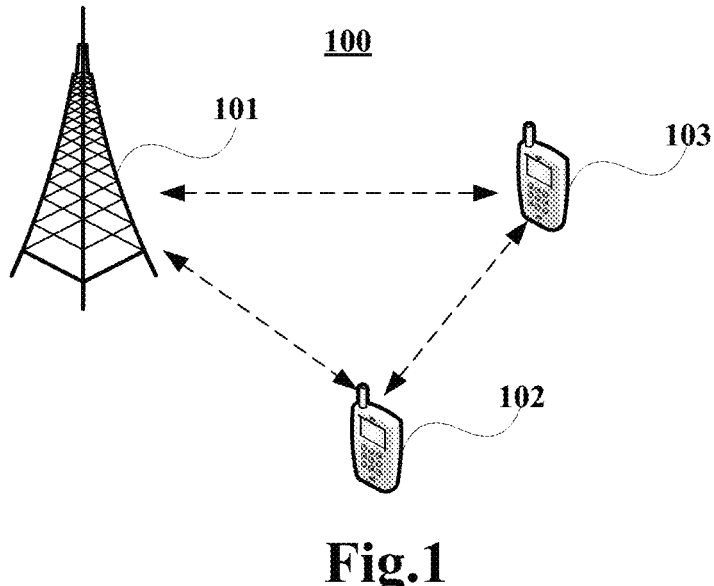

201 a terminal equipment selects a random access preamble

202 the terminal equipment transmits the random access preamble to a network device on the physical random access channel resource; wherein the random access preamble is used to indicate that the terminal equipment has sidelink data to be transmitted, and/or the physical random access channel resource is used to indicate that the terminal equipment has sidelink data to be transmitted

203 the terminal equipment receives, a random access response transmitted by the network device, the random access response including a sidelink grant

Fig.2

500 the network device configures a random access preamble set and/or a physical random access channel resource set, and transmits the configured random access preamble set and/or the physical random access channel resource set to the terminal equipment

501 a network device receives, on a physical random access channel resource, a random access preamble transmitted by a terminal equipment; wherein the random access preamble is used to indicate that the terminal equipment has sidelink data to be transmitted, and/or the physical random access channel resource is used to indicate that the terminal equipment has sidelink data to be transmitted

502 the network device transmits a random access response to the terminal equipment

Fig.5

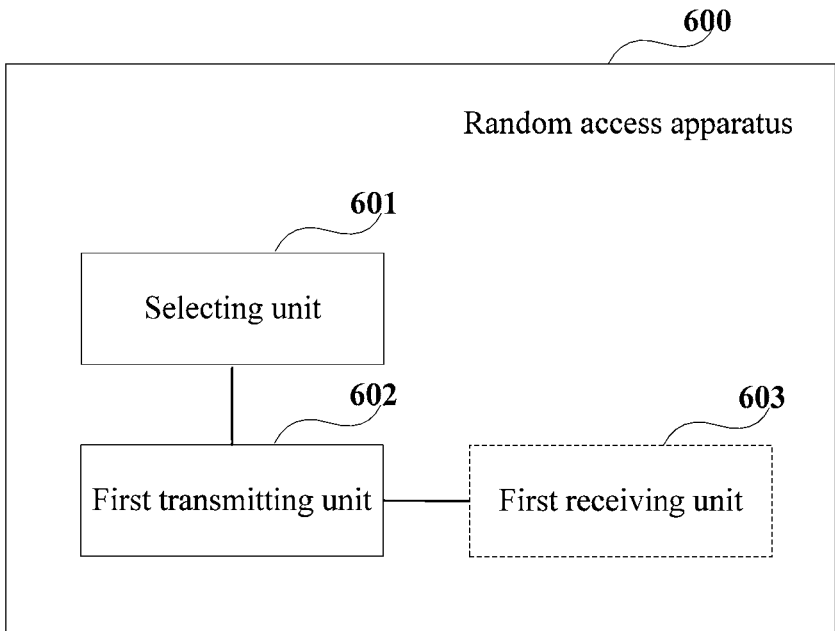

901 a network device receives, an uplink message transmitted by a terminal equipment at a physical uplink data channel, the uplink message including sidelink-related information

902 transmitting a contention resolution message by the network device to the terminal equipment

1000

Random access apparatus

1001

Fourth transmitting unit

1002

Fourth receiving unit

1100

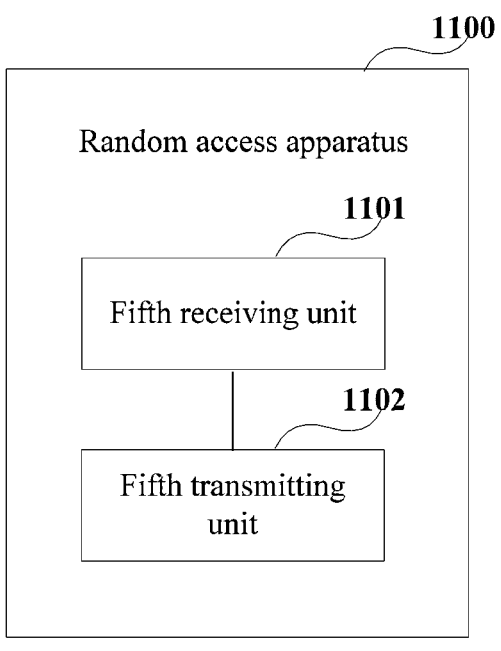

Random access apparatus

1101

Fifth receiving unit

1102

Fifth transmitting unit

Fig.11

1201 a terminal equipment receives, scheduling request configuration corresponding to sidelink data transmitted by a network device, the scheduling request configuration including a set of PUCCH resources on a bandwidth part (BWP)

1202 the terminal equipment triggers a scheduling request when the terminal equipment has sidelink data to be transmitted and there exists no currently available sidelink resource

1203 the terminal equipment transmits the scheduling request by using a PUCCH resource to which the scheduling request configuration corresponds

Fig.12

1301 a network device transmits scheduling request configuration corresponding to sidelink data to a terminal equipment, the scheduling request configuration including a set of PUCCH resources on a BWP

1302 the network device receives, a scheduling request transmitted by the terminal equipment by using the PUCCH resource to which the scheduling request configuration corresponds

Fig.13

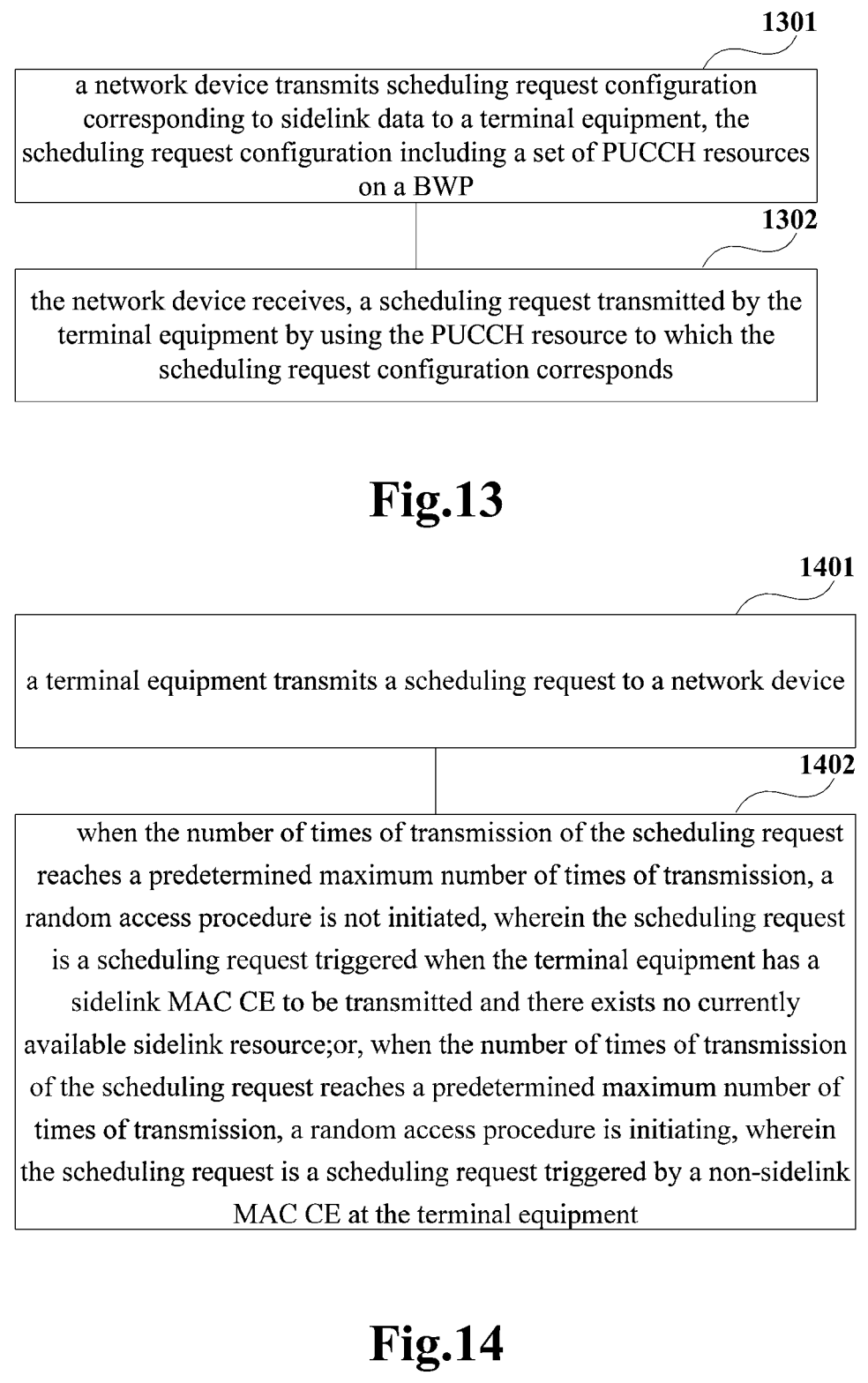

1401 a terminal equipment transmits a scheduling request to a network device

1402 when the number of times of transmission of the scheduling request reaches a predetermined maximum number of times of transmission, a random access procedure is not initiated, wherein the scheduling request is a scheduling request triggered when the terminal equipment has a sidelink MAC CE to be transmitted and there exists no currently available sidelink resource;or, when the number of times of transmission of the scheduling request reaches a predetermined maximum number of times of transmission, a random access procedure is initiating, wherein the scheduling request is a scheduling request triggered by a non-sidelink MAC CE at the terminal equipment

Fig.14

1501 a scheduling request is triggered when a terminal equipment has sidelink data to be transmitted and there exists no currently available sidelink resource

1502 a random access procedure is initiated when the scheduling request is not configured with a valid PUCCH resource or a maximum number of times of transmission of the scheduling request is reached

1503 the random access procedure is stopped when a duration of the random access procedure exceeds maximum latency of the sidelink data

RANDOM ACCESS METHOD AND APPARATUS AND RESOURCE CONFIGURATION METHOD AND APPARATUS

CROSS-REFERENCE TO RELATED APPLICATION

This application is a continuation application of International Application PCT/CN2020/084062 filed on Apr. 9, 2020, and designated the U.S., the entire contents of which are incorporated herein by reference.

TECHNICAL FIELD

This disclosure relates to the field of communication technologies.

BACKGROUND

Vehicle communication services are denoted by V2X (Vehicle-to-everything) services. V2X services may include multiple types, such as Vehicle-to-Vehicle (V2V) communication services, Vehicle-to-Infrastructure (V2I) communication services, and Vehicle-to-Pedestrian (V2P) communication services. V2X services may be provided via a PC5 interface and/or a Uu interface. V2X services transmitted via a PC5 interface may be provided by V2X sidelink (SL) communication. The V2X sidelink communication is a communication mode in which terminal equipments may directly communicate with each other via a PC5 interface. In long term evolution (LTE) or new radio (NR), such a communication mode is support no matter the terminal equipments are within or outside the coverage of the network.

V2X has two resource allocation modes, mode 1 and mode 2. Mode 1 refers to a resource allocation mode where a network device schedules sidelink resources, and mode 2 refers to a resource allocation mode where a terminal equipment autonomously selects resources.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

When a terminal equipment is in mode 1, if the terminal equipment has a sidelink media access control control element (SL MAC CE) to transmit and there exists no available sidelink resource currently, the terminal equipment will trigger a scheduling request (SR). Once an SR is triggered, the SR is in a pending state until it is cancelled, and the terminal equipment expects to transmit the SR by using SR configuration to which the SL MAC CE corresponds, the SR configuration including a set of physical uplink control channel (PUCCH) resources.

For each pending SR, if there exists no valid PUCCH resource configured by a network device for the SR, or if the number of times of transmission of the SR reaches a maximum value, a random access procedure will be initiated. It was found by the inventors that when the terminal equipment only has an SL MAC CE to be transmitted, if SR configuration to which the SL MAC CE corresponds has no valid PUCCH resource (including cases where no valid PUCCH resources are configured and PUCCH resources are released due to the timeout of a timing advance timer timeAlignmentTimer), a random access procedure will be initiated. However, as data of the terminal equipment to be transmitted are unable to be distinguished in an existing random access procedure, the network device does not learn whether to allocate uplink resources or sidelink resources, or how many resources to be allocated.

And furthermore, it was found by the inventors that for a random access procedure triggered when the maximum number of times of transmission of an SR triggered by the SL MAC CE is reached, as the time elapsed to reach the maximum number of times of transmission of the SR is relatively long and the terminal equipment may move relatively fast, information carried by the MAC CE, such as channel state information, may have expired, and reporting of the information may be of little use to a transmitting terminal equipment.

In order to solve at least one of the above problems, embodiments of this disclosure provide a random access method and apparatus.

According to an aspect of the embodiments of this disclosure, there is provided a random access apparatus, applicable to a network device, wherein the apparatus includes:

a third receiving unit configured to, on a physical random access channel resource, receive a random access preamble transmitted by a terminal equipment; wherein the random access preamble is used to indicate that the terminal equipment has sidelink data to be transmitted, and/or the physical random access channel resource is used to indicate that the terminal equipment has sidelink data to be transmitted; and a second transmitting unit configured to transmit a random access response to the terminal equipment.

According to another aspect of the embodiments of this disclosure, there is provided a random access apparatus, applicable to a terminal equipment, wherein the apparatus includes:

a fourth transmitting unit configured to transmit an uplink message to a network device at a physical uplink data channel in a random access procedure, the uplink message including sidelink-related information; and a fourth receiving unit configured to receive a contention resolution message transmitted by the network device.

According to a further aspect of the embodiments of this disclosure, there is provided a random access apparatus, applicable to a network device, the apparatus including:

a seventh transmitting unit configured to transmit scheduling request configuration to which sidelink data corresponds to a terminal equipment, the scheduling request configuration including a set of physical uplink control channel resources on a bandwidth part (BWP); and a seventh receiving unit configured to receive a scheduling request transmitted by the terminal equipment by using the scheduling request configuration.

An advantage of the embodiments of this disclosure exists in that by indicating in the random access procedure to the network device that the terminal equipment has a sidelink MAC CE to be transmitted or by the mode of always transmitting SR but not initiating random access procedure, it may be avoided that the network device does not learn that the terminal equipment has a sidelink MAC CE to be transmitted, so that the network device allocates resources for the sidelink, and resource consumption may be lowered. And furthermore, the mode of not initiating a random access procedure may reduce radio resources occupied in a random access procedure, and utilization of radio resources may be improved.

Another advantage of the embodiments of this disclosure exists in that by stopping the transmission of the SR or canceling the SR when the transmission of the SR exceeds a latency limit required by the MAC CE, it is possible to avoid initiating a random access procedure and to avoid requesting sidelink resources from the network device for transmitting outdated sidelink MAC CEs, which may reduce resource consumption on a Uu interface and the sidelink, and improve utilization of radio resources.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment may be combined with elements and features depicted in one or more additional drawings or embodiments. Moreover, in the drawings, like reference numerals designate corresponding parts throughout the several views and may be used to designate like or similar parts in more than one embodiments.

FIG. 1 is schematic diagram of a communication system of an embodiment of this disclosure;

FIG. 2 is a schematic diagram of the random access method of the first aspect of the embodiments of this disclosure;

FIG. 5 is a schematic diagram of the random access method of the second aspect of the embodiments of this disclosure;

FIG. 6 is a schematic diagram of the random access apparatus of the third aspect of the embodiments of this disclosure;

FIG. 11 is a schematic diagram of the random access apparatus of the eighth aspect of the embodiments of this disclosure;

FIG. 12 is a schematic diagram of the sidelink transmission method of the ninth aspect of the embodiments of this disclosure;

FIG. 13 is a schematic diagram of the resource configuration method of the tenth aspect of the embodiments of this disclosure;

FIG. 14 is a schematic diagram of the random access method of the eleventh aspect of the embodiments of this disclosure;

FIG. 15 is a schematic diagram of the random access method of the twelfth aspect of the embodiments of this disclosure;

DETAILED DESCRIPTION OF THE DISCLOSURE

Figure 3:
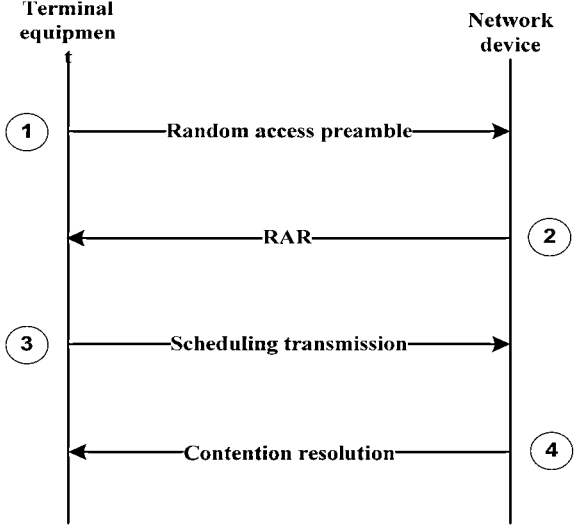
FIG. 3 is a schematic diagram of a 4-step random access procedure of the embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiments of this disclosure, existing services or services that may be implemented in the future may be performed between the network device 101 and the terminal equipments 102, 103 or between the terminal equipments 102, 103. For example, such services may include but not limited to an enhanced mobile broadband (eMBB), massive machine type communication (MTC), ultra-reliable and low-latency communication (URLLC), and vehicle-to-everything (V2X), etc. This disclosure shall be described by taking that LTE or NR uplink or downlink communication is performed between the network device 101 and the terminal equipment 102 and LTE or NR sidelink communication (SL communication) is performed between the terminal equipments 102, 103 as examples. The SL communication here is, for example, communication related to V2X services.

A terminal equipment as a transmitter of service data shall be hereinafter referred to as a transmitting terminal equipment, which transmits sidelink data to one or more other terminal equipments (a receiving terminal equipment or a target terminal equipment).

The embodiments of this disclosure shall be described below with reference to the accompanying drawings.

In the embodiments of this disclosure, it may be indicated to a network device in a random access procedure that a terminal equipment has a sidelink MAC CE to be transmitted, which shall be described below with reference to the embodiments of the first to the eighth aspects.

Embodiment of the First Aspect

The embodiment of this disclosure provides a random access method, which shall be described from a terminal equipment side. FIG. 2 is a schematic diagram of the random access method of the embodiment of this disclosure. As shown in FIG. 2, the method includes:

201: a terminal equipment selects a random access preamble;

202: the terminal equipment transmits the random access preamble to a network device on the physical random access channel resource; wherein the random access preamble is used to indicate that the terminal equipment has sidelink data to be transmitted, and/or the physical random access channel resource is used to indicate that the terminal equipment has sidelink data to be transmitted.

According to the embodiment of this disclosure, it is indicated to the network device in the random access procedure that the terminal equipment has a sidelink MAC CE to be transmitted, which may avoid a problem that the network device does not learn that the terminal equipment has a sidelink MAC CE to be transmitted, so that the network device allocates resources for the sidelink, and resource consumption may be reduced.

It should be noted that FIG. 2 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

In some embodiments, when the terminal equipment is in mode 1, if the terminal equipment has a sidelink medium access control control element (SL MAC CE) to be transmitted and no sidelink resources are currently available, the terminal equipment will trigger a scheduling request (SR). Once an SR is triggered, the SR is in a pending state until it is cancelled, and the terminal equipment expects to transmit the SR by using SR configuration to which the SL MAC CE corresponds, the SR configuration including a physical uplink control channel (PUCCH) resource set. For each pending SR, if there is no valid PUCCH resource configured by the network device for the SR, or the number of times of transmission of the SR reaches a maximum value, the terminal equipment will initiate a random access procedure. It should be noted that the terminal equipment is caused to initiate a random access procedure in other scenarios is also applicable to the embodiments of this disclosure.

Figure 4:
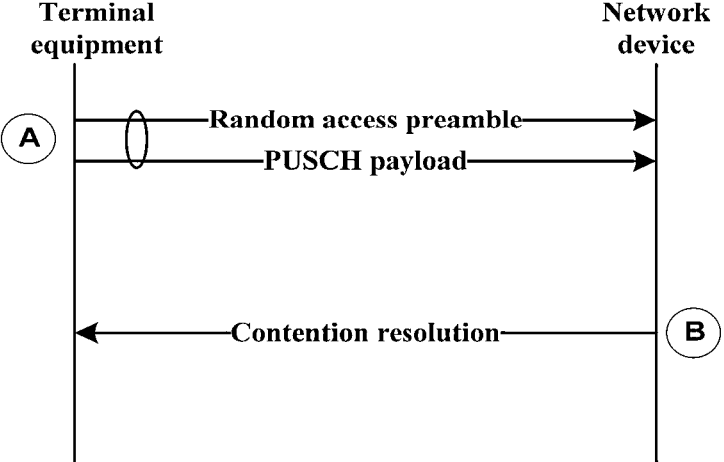
FIG. 4 is a schematic diagram of a 2-step random access procedure of the embodiment of this disclosure.

In some embodiments, the random access procedure is contention-based random access, and a contention-based random access procedure includes 4-step random access and 2-step random access. FIG. 3 is a schematic diagram of a 4-step random access procedure, and FIG. 4 is a schematic diagram of a 2-step access procedure. As shown in FIG. 3, in MSG.1, the terminal equipment transmits a random access preamble, in MSG.2, the network device transmits a random access response, in MSG.3, the terminal equipment transmits an uplink message on an allocated uplink resource, and in MSG.4, the network device feeds a contention resolution message back to a terminal equipment succeeding in access. As shown in FIG. 4, in MSG.A, the terminal equipment transmits a random access preamble and transmits uplink data on an uplink resource. In MSG.B, the network device feeds a contention resolution message back to a terminal equipment succeeding in access, and such information as downlink data, may be carried.

In some embodiments, whether the terminal equipment has sidelink data to be transmitted or uplink data to be transmitted may be distinguished via a physical random access preamble in MSG.1 or MSG.A and/or a physical random access channel resource in the random access procedure. In the above MSG.1 or MSG.A, the terminal equipment selects a random access preamble in the random access preamble set and a resource in the physical random access channel (PRACH) resource set to transmit the selected random access preamble. A preamble or preamble index or preamble identifier in the random access preamble set is used to indicate that the terminal equipment has sidelink data to be transmitted, and/or a resource in the physical random access channel resource set is used to indicate that the terminal equipment has sidelink data to be transmitted.

In some embodiments, the random access preamble set and/or the physical random access channel resource set is/are configured by the network device, or is/are pre-configured, or is/are a random access preamble set and/or the physical random access channel resource set used to indicate that the terminal equipment has sidelink data to be transmitted by default.

In some embodiments, in a case where the random access preamble set and/or the physical random access channel resource set is/are configured by the network device, the method further includes: receiving, by the terminal equipment, the random access preamble set and/or the physical random access channel resource set configured by the network device. For example, when the terminal equipment is in a radio resource control (RRC) connected state, the network device may configure the random access preamble set and/or the physical random access channel resource set via an RRC reconfiguration message or an RRC re-establishment message; and when the terminal equipment is in an idle or inactive state, the network device may configure the random access preamble set and/or the physical random access channel resource set via an RRC setup message or an RRC resume message or system information (such as SIB1). The network device may configure the random access preamble set and/or physical random access channel resource set specific for a cell or specific for a UE, and may also configure the random access preamble set and/or the physical random access channel resource set specific for a synchronization signal and PBCH block (SSB) or specific for a channel state information reference signal (CSI-RS), etc.

In some embodiments, after receiving the random access preamble transmitted by the terminal equipment, the network device may determine whether the terminal equipment has sidelink data to be transmitted according to the random access preamble and/or the physical random access channel resource; for example, the network device determines that the terminal equipment has sidelink data to be transmitted when the network device determines that the random access preamble is a preamble in the above configured or pre-configured or default set and/or determines that the random access resource is a resource in the above configured or pre-configured or default set.

In some embodiments, in order to support sidelink transmission of the terminal equipment and speed up allocation of sidelink resources, the method may further include (optional):

203: the terminal equipment receives, a random access response transmitted by the network device, the random access response including a sidelink grant.

In some embodiments, after the network device receives the random access preamble transmitted by the terminal equipment, it will feed a random access response back to the terminal equipment; for example, the random access response (RAR) may be carried by MSG.2 in FIG. 3 or MSG.B in FIG. 4, the RAR including a sidelink grant (SL grant), which may replace an uplink grant (UL grant) in an existing RAR or may be transmitted together with an uplink grant in an existing RAR. For example, the sidelink grant may be indicated by a reserved bit, and when a bit value is 1, it indicates a sidelink grant, and when the bit value is 0, it indicates an uplink grant, vice versa, and this embodiment is not limited thereto.

In some embodiments, after the network device receives the random access preamble transmitted by the terminal equipment, it will feed a response message (such as MSG.2) back to the terminal equipment, the response message including a random access preamble identifier (RAPID). The terminal equipment receives the RAPID, and if the RAPID is identical to an identifier of the random access preamble transmitted by the terminal equipment in MSG.1 or MSG.A or the RAPID belongs to the random access preamble set, the terminal equipment deems that the random access response is successfully received or the random access procedure is successfully completed or acknowledgement of allocation of sidelink resources is received.

In some embodiments, the random access response may not include other fields in the existing RAR, such as not including a timing advance control (TAC) field and/or a temporary cell-radio network temporary identity (temporary C-RNTI) field.

In some embodiments, the above sidelink data is a sidelink MAC CE, such as a channel state information reporting MAC CE; however, this embodiment is not limited thereto.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

Embodiment of a Second Aspect

The embodiment of this disclosure provides a random access method, which shall be described from a network device side, with contents identical to those in the embodiment of the first aspect being not going to be described herein any further.

FIG. 5 is a schematic diagram of the random access method of the embodiment of this disclosure. As shown in FIG. 5, the method includes:

501: a network device receives, on a physical random access channel resource, a random access preamble transmitted by a terminal equipment; wherein the random access preamble is used to indicate that the terminal equipment has sidelink data to be transmitted, and/or the physical random access channel resource is used to indicate that the terminal equipment has sidelink data to be transmitted; and

502: the network device transmits a random access response to the terminal equipment.

According to the embodiment of this disclosure, by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

It should be noted that FIG. 5 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 5.

In some embodiments, the terminal equipment selects a random access preamble in the random access preamble set and a resource in the physical random access channel resource set to transmit the selected random access preamble. The preamble or the preamble index or the preamble identifier in the random access preamble set is used to indicate that the terminal equipment has sidelink data to be transmitted, and/or the resource in the physical random access channel resource set is used to indicate that the terminal equipment has sidelink link data to be transmitted.

In some embodiments, the random access preamble set and/or the physical random access channel resource set is/are configured by the network device, or is/are pre-configured, or is/are a random access preamble set and/or a physical random access channel resource set used to indicate that the terminal equipment has sidelink data to be transmitted by default.

In some embodiments, after receiving the random access preamble transmitted by the terminal equipment, the network device may determine whether the terminal equipment has sidelink data to be transmitted according to the random access preamble and/or physical random access channel resource; for example, the network device determines that the terminal equipment has sidelink data to be transmitted when the network device determines that the random access preamble is a preamble in the above configured or pre-configured or default set and/or determines that the random access resource is a resource in the above configured or pre-configured or default set.

In some embodiments, when the random access preamble set and/or the physical random access channel resource set is/are configured by the network device, the method further includes:

500: the network device configures a random access preamble set and/or a physical random access channel resource set, and transmits the configured random access preamble set and/or the physical random access channel resource set to the terminal equipment.

In some embodiments, after the network device receives the random access preamble transmitted by the terminal equipment, it will feed a random access response back to the terminal equipment, for example, the random access response (RAR) is carried by MSG.2 in FIG. 3 or MSG.B in FIG. 4.

In order to support the sidelink transmission of the terminal equipment and speed up allocation of sidelink resources, the random access response may further include a sidelink grant (SL grant), which may replace an uplink grant (UL grant) in an existing RAR or may be transmitted together with the uplink grant in the existing RAR. For example, the sidelink grant may be indicated by a reserved bit, a bit value of 1 indicates a sidelink grant, and a bit value of 0 indicates an uplink grant, vice versa, or whether the RAR includes a sidelink grant and an uplink grant is indicated by the reserved bit, when the bit value is 1, it indicates that the sidelink grant and the uplink grant are included, and when the bit value is 0, it indicates that only the uplink grant is included, and vice versa; however, this embodiment is not limited thereto.

In some embodiments, the random access response may not include other fields in the existing RAR, such as not including a timing advance control (TAC) field and/or a temporary cell-radio network temporary identity (temporary C-RNTI) field.

In some embodiments, after the network device receives the random access preamble transmitted by the terminal equipment, it will feed back a response message (such as MSG.2), the response message including a random access preamble identifier (RAPID). The terminal equipment receives the RAPID, and if the RAPID is identical to an identifier of the random access preamble transmitted by the terminal equipment in MSG.1 or MSG.A or the RAPID belongs to the random access preamble set, the terminal equipment deems that the random access response is successfully received or the random access procedure is successfully completed or acknowledgement of allocation of sidelink resources is received.

In some embodiments, the above sidelink data is a sidelink MAC CE, such as a channel state information reporting MAC CE; however, this embodiment is not limited thereto.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

Embodiment of a Third Aspect

The embodiment of this disclosure provides a random access apparatus. The apparatus may be, for example, a terminal equipment (such as the above-described terminal equipment), or one or some components or assemblies configured in a terminal equipment, with contents identical to those in the embodiment of the first aspect being not going to be described herein any further.

FIG. 6 is a schematic diagram of the random access apparatus of the embodiment of this disclosure. In some embodiments, as shown in FIG. 6, a random access apparatus 600 includes:

a selecting unit 601 configured to select a random access preamble; and a first transmitting unit 602 configured to transmit the random access preamble to a network device on a physical random access channel resource; wherein the random access preamble is used to indicate that the terminal equipment has sidelink data to be transmitted, and/or the physical random access channel resource is used to indicate that the terminal equipment has sidelink data to be transmitted.

According to the embodiment of this disclosure, by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

In some embodiments, whether the terminal equipment has sidelink data to be transmitted or uplink data to be transmitted may be distinguished via the random access preamble in MSG.1 or MSG.A and/or physical random access channel resource in the random access procedure. In MSG.1 or MSG.A described in the first aspect, the selecting unit 601 selects the random access preamble in the random access preamble set and the resource in the physical random access channel resource set to transmit the selected random access preamble. The preamble or the preamble index or the preamble identifier in the random access preamble set is used to indicate that the terminal equipment has sidelink data to be transmitted, and/or the resource in the physical random access channel resource set is used to indicate that the terminal equipment has a sidelink data to be transmitted.

In some embodiments, the random access preamble set and/or the physical random access channel resource set is/are configured by the network device, or is/are pre-configured, or is/are default random access preamble set and/or physical random access channel resource set used to indicate that the terminal equipment has sidelink data to be transmitted.

In some embodiments, when the random access preamble set and/or the physical random access channel resource set is/are configured by the network device, the apparatus further includes (optional): a second receiving unit (not shown) configured to receive the random access preamble set and/or the physical random access channel resource set configured by the network device.

For example, when the terminal equipment is in a radio resource control (RRC) connected state, the second receiving unit may receive the random access preamble set and/or the random access preamble set via an RRC reconfiguration message or an RRC re-establishment (re-establishment) message; and when the terminal equipment is in an idle or inactive state, the second receiving unit may receive the random access preamble set and/or the physical random access channel resource set via an RRC setup message or an RRC resume message or system information (such as SIB1). The network device may configure the random access preamble set and/or physical random access channel resource set specific for a cell or specific for a UE, and may also configure the random access preamble set and/or the physical random access channel resource set specific for a synchronization signal and PBCH block (SSB) or specific for a channel state information reference signal (CSI-RS), etc.

In some embodiments, in order to support sidelink transmission of the terminal equipment and speed up allocation of sidelink resources, the apparatus may further include (optional):

a first receiving unit 603 configured to receive a random access response transmitted by the network device, the random access response including a sidelink grant.

In some embodiments, after the network device receives the random access preamble transmitted by the terminal equipment, it will feed a random access response back to the terminal equipment; for example, the random access response (RAR) may be carried by MSG.2 in FIG. 3 or MSG.B in FIG. 4, the RAR including a sidelink grant (SL grant), which may replace an uplink grant (UL grant) in an existing RAR or may be transmitted together with an uplink grant in an existing RAR. For example, the sidelink grant may be indicated by a reserved bit, and when a bit value is 1, it indicates a sidelink grant, and when the bit value is 0, it indicates an uplink grant, vice versa; or, whether the RAR includes a sidelink grant and an uplink grant may be indicated by a reserved bit, and when a bit value is 1, it indicates a sidelink grant and an uplink grant are included, and when the bit value is 0, it indicates an uplink grant is only included, vice versa, and this embodiment is not limited thereto.

In some embodiments, after the network device receives the random access preamble transmitted by the terminal equipment, it will feed a response message (such as MSG.2) back to the terminal equipment, the response message including a random access preamble identifier (RAPID). The terminal equipment receives the RAPID, and if the RAPID is identical to an identifier of the random access preamble transmitted by the terminal equipment in MSG.1 or MSG.A or the RAPID belongs to the random access preamble set, the terminal equipment deems that the random access response is successfully received or the random access procedure is successfully completed or acknowledgement of allocation of sidelink resources is received.

In some embodiments, the random access response may not include other fields in the existing RAR, such as not including a timing advance control (TAC) field and/or a temporary cell-radio network temporary identity (temporary C-RNTI) field.

In some embodiments, the above sidelink data is a sidelink MAC CE, such as a channel state information reporting MAC CE; however, this embodiment is not limited thereto.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the random access apparatus 600 may further include other components or modules, and reference may be made to the related techniques for specific contents of these components or modules.

Furthermore, for the sake of simplicity, connection relationships between the components or modules or signal profiles thereof are only illustrated in FIG. 6. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

It can be seen from the above embodiment that by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

Embodiment of a Fourth Aspect

The embodiment of this disclosure provides a random access apparatus. The apparatus may be, for example, a network device (such as the above-described network device), or one or some components or assemblies configured in a network device, with contents identical to those in the embodiment of the second aspect being not going to be described herein any further.

Figure 7:
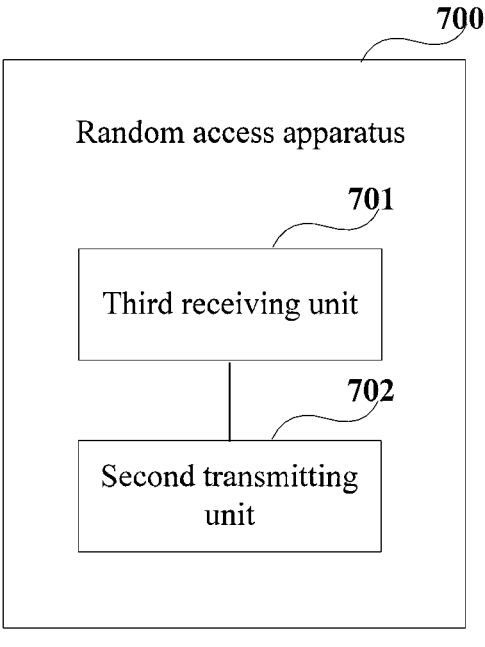
FIG. 7 is a schematic diagram of the random access apparatus of the fourth aspect of the embodiments of this disclosure.

FIG. 7 is a schematic diagram of the random access apparatus of the embodiment of this disclosure. In some embodiments, as shown in FIG. 7, a random access apparatus 700 includes:

a third receiving unit 701 configured to, on a physical random access channel resource, receive a random access preamble transmitted by a terminal equipment; wherein the random access preamble is used to indicate that the terminal equipment has sidelink data to be transmitted, and/or the physical random access channel resource is used to indicate that the terminal equipment has sidelink data to be transmitted; and a second transmitting unit 702 configured to transmit a random access response to the terminal equipment.

According to the embodiment of this disclosure, by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

In some embodiments, the random access preamble set and/or the physical random access channel resource set is/are configured by the network device, or is/are pre-configured, or is/are a random access preamble set and/or a physical random access channel resource set used to indicate that the terminal equipment has sidelink data to be transmitted by default.

In some embodiments, after receiving the random access preamble transmitted by the terminal equipment, the network device may determine whether the terminal equipment has sidelink data to be transmitted according to the random access preamble and/or physical random access channel resource; for example, the network device determines that the terminal equipment has sidelink data to be transmitted when the network device determines that the random access preamble is a preamble in the above configured or pre-configured or default set and/or determines that the random access resource is a resource in the above configured or pre-configured or default set.

In some embodiments, in the case where the random access preamble set and/or the physical random access channel resource set is/are configured by the network device, the apparatus further includes (optional, not shown):

a configuring unit configured to configure the random access preamble set and/or the physical random access channel resource set; and a third transmitting unit configured to transmit the configured random access preamble set and/or the physical random access channel resource set to the terminal equipment.

For example, when the terminal equipment is in a radio resource control (RRC) connected state, the third transmitting unit may transmit the random access preamble set and/or the physical random access channel resource set via an RRC reconfiguration message or an RRC re-establishment message; and when the terminal equipment is in an idle or inactive state, the third transmitting unit may transmit the random access preamble set and/or the physical random access channel resource set via an RRC setup message or an RRC resume message or system information (such as SIB1). The configuring unit may configure the random access preamble set and/or physical random access channel resource set specific for a cell or specific for a UE, and may also configure the random access preamble set and/or the physical random access channel resource set specific for a synchronization signal and PBCH block (SSB) or specific for a channel state information reference signal (CSI-RS), etc.

In some embodiments, after the network device receives the random access preamble, the second transmitting unit 702 will feed a random access response to the terminal equipment, for example, the random access response (RAR) is carried by MSG.2 in FIG. 3 or MSG.B in FIG. 4.

In order to support the sidelink transmission of the terminal equipment and speed up allocation of sidelink resources, the random access response may further include a sidelink grant (SL grant), which may replace an uplink grant (UL grant) in an existing RAR or may be transmitted together with the uplink grant in the existing RAR. For example, the sidelink grant may be indicated by a reserved bit, a bit value of 1 indicates a sidelink grant, and a bit value of 0 indicates an uplink grant, vice versa, or whether the RAR includes a sidelink grant and an uplink grant is indicated by the reserved bit, when the bit value is 1, it indicates that the sidelink grant and the uplink grant are included, and when the bit value is 0, it indicates that only the uplink grant is included, and vice versa; however, this embodiment is not limited thereto.

In some embodiments, the random access response may not include other fields in the existing RAR, such as not including a timing advance control (TAC) field and/or a temporary cell-radio network temporary identity (temporary C-RNTI) field.

In some embodiments, after the network device receives the random access preamble transmitted by the terminal equipment, the second transmitting unit 702 will feed back a response message (such as MSG.), the response message including a random access preamble identifier (RAPID). The terminal equipment receives the RAPID, and if the RAPID is identical to an identifier of the random access preamble transmitted by the terminal equipment in MSG.1 or MSG.A or the RAPID belongs to the random access preamble set, the terminal equipment deems that the random access response is successfully received or the random access procedure is successfully completed or acknowledgement of allocation of sidelink resources is received.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the random access apparatus 700 may further include other components or modules, and reference may be made to the related techniques for specific contents of these components or modules.

Furthermore, for the sake of simplicity, connection relationships between the components or modules or signal profiles thereof are only illustrated in FIG. 7. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

It can be seen from the above embodiment that by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

Embodiment of a Fifth Aspect

Figure 8:
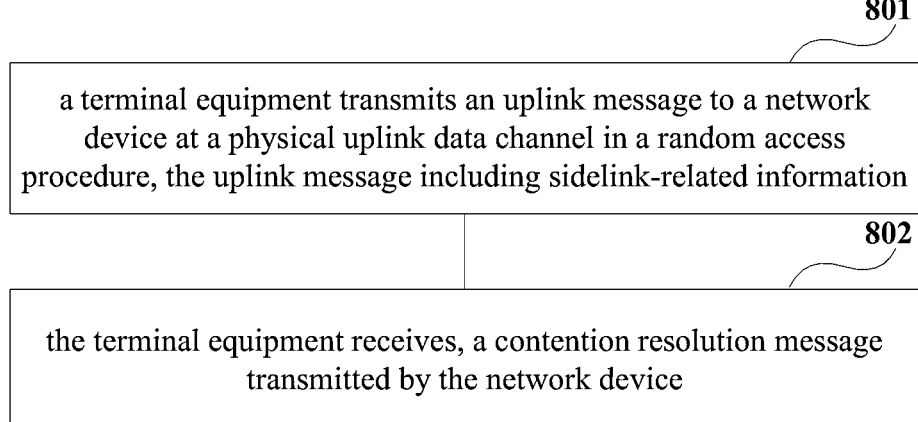
FIG. 8 is a schematic diagram of the random access method of the fifth aspect of the embodiments of this disclosure.

The embodiment of this disclosure provides a random access method, which shall described from a terminal equipment side. FIG. 8 is a schematic diagram of the random access method of the embodiment of this disclosure. As shown in FIG. 8, the method includes:

801: a terminal equipment transmits an uplink message to a network device at a physical uplink data channel in a random access procedure, the uplink message including sidelink-related information; and

802: the terminal equipment receives, a contention resolution message transmitted by the network device.

According to the embodiment of this disclosure, by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

It should be noted that FIG. 8 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 8.

In some embodiments, when the terminal equipment is in mode 1, if the terminal equipment has a sidelink medium access control control element (SL MAC CE) to be transmitted and no sidelink resource is currently available, the terminal equipment will trigger a scheduling request (SR). Once an SR is triggered, the SR is in a pending state until it is cancelled, and the terminal equipment expects to transmit the SR by using SR configuration to which the SL MAC CE corresponds, the SR configuration including a physical uplink control channel (PUCCH) resource set. For each pending SR, if there is no valid PUCCH resource configured by the network device for the SR, or the number of times of transmission of the SR reaches a maximum value, the terminal equipment will initiate a random access procedure. It should be noted that the terminal equipment is caused to initiate a random access procedure in other scenarios is also applicable to the embodiments of this disclosure.

In some embodiments, the random access procedure is contention-based random access, and a contention-based random access procedure includes 4-step random access and 2-step random access. FIG. 3 is a schematic diagram of a 4-step random access procedure, and FIG. 4 is a schematic diagram of a 2-step access procedure. As shown in FIG. 3, in MSG.1, the terminal equipment transmits a random access preamble, in MSG.2, the network device transmits a random access response, in MSG.3, the terminal equipment transmits an uplink message on an allocated uplink resource, and in MSG.4, the network device feeds a contention resolution message back to a terminal equipment succeeding in access. As shown in FIG. 4, in MSG.A, the terminal equipment transmits a random access preamble and transmits uplink data on an uplink resource. In MSG.B, the network device feeds a contention resolution message back to a terminal equipment succeeding in access, and such information as downlink data, may be carried.

In some embodiments, whether the terminal equipment has sidelink data to be transmitted or uplink data to be transmitted may be distinguished by whether there exists sidelink-related information on a PUSCH in MSG.3 or MSG.A in the random access procedure, that is, the terminal equipment transmits an uplink message to the network device on the physical uplink data channel (PUSCH), that is, transmitting the above-mentioned MSG.3 or MSG.A on the PUSCH, MSG.3 or MSG.A including the sidelink-related information, and the sidelink-related information being used to indicate that the terminal equipment has sidelink data to be transmitted. The above sidelink data may be a sidelink MAC CE, such as a channel state information reporting MAC CE; however, this embodiment is not limited thereto.

In some embodiments, the sidelink-related information is a sidelink buffer status report, which is used to indicate a logical channel group and/or a buffer size to which the sidelink data (such as the SL MAC CE) corresponds. In other words, the SL MAC CE may also trigger the sidelink buffer status report, the SL BSR being used to report an identifier (or index) of the logical channel group to which the sidelink MAC CE (such as the CSI reporting MAC CE) corresponds and/or corresponding buffer status information. For example, the identifier of the logical channel group to which the sidelink CSI reporting MAC CE corresponds is of a fixed value, such as 8, a corresponding buffer size is 1, and the terminal equipment carries the SL BSR by using MSG.3 or MSG.A of the random access procedure and transmits it to the network device. The network device may determine how much sidelink data needing to be transmitted that the terminal equipment has according to the SL BSR, that is, it may allocate corresponding sidelink resources to the terminal equipment.

In some embodiments, the sidelink-related information is a logical channel identifier (LCID) to which the sidelink data (e.g. the SL MAC CE) corresponds, for example, a value of which is one in 33-48. The terminal equipment may include the LCID in an MAC sub-header of an uplink MAC sub-protocol data unit (PDU). The terminal equipment carries the MAC sub-PDU by MSG.3 or MSG.A in the random access procedure and transmits it to the network device. According to the LCID, the network device may determine that the terminal equipment has sidelink data needing to be transmitted, that is, it may allocate corresponding sidelink resources to the terminal equipment.

In some embodiments, the sidelink-related information is a sidelink RNTI of the terminal equipment, and the terminal equipment carries the SL-RNTI by MSG.3 or MSG.A in the random access procedure, for example, it may transmit an SL-RNTI MAC CE with a predefined LCID to the network device, and according to the SL-RNTI, the network device may determine that the terminal equipment has sidelink data to be transmitted, that is, it may allocate corresponding sidelink resources to the terminal equipment.

In some embodiments, the uplink message may further include a C-RNTI of the terminal equipment, which is used for contention resolution of random access.

In some embodiments, the terminal equipment receives the contention resolution message transmitted by the network device, i.e. MSG.4 or MSG.B. For example, the network device may scramble a physical downlink control channel scheduling MSG.4 or MSG.B by using the C-RNTI, and when the terminal equipment decodes a physical downlink control channel (PDCCH) addressing the C-RNTI of its own, it indicates that contention resolution is completed. The network device may allocate sidelink resources (i.e. carrying an SL grant) via a PDCCH addressing the SL-RNTI of terminal equipment, and the terminal equipment transmits the sidelink data by using the allocated sidelink resources.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner. For example, the embodiment of the first aspect may be combined with the embodiment of the fifth aspect, or may be used separately.

It can be seen from the above embodiment that by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

Embodiment of a Sixth Aspect

The embodiment of this disclosure provides a random access method, which shall described from a network device side, with contents identical to those in the embodiment of the fifth aspect being not going to be described herein any further.

Figure 9:
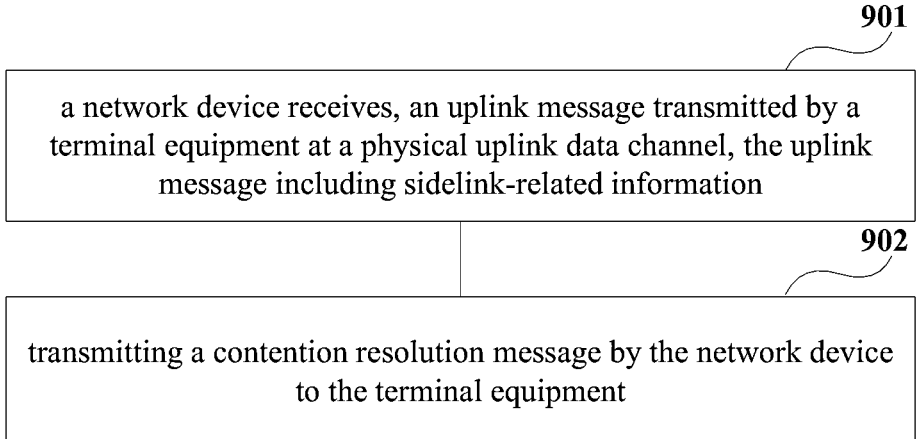
FIG. 9 is a schematic diagram of the random access method of the sixth aspect of the embodiments of this disclosure.

FIG. 9 is a schematic diagram of the random access method of the embodiment of this disclosure. As shown in FIG. 9, the method includes:

901: a network device receives, an uplink message transmitted by a terminal equipment at a physical uplink data channel, the uplink message including sidelink-related information; and

902: transmitting a contention resolution message by the network device to the terminal equipment.

According to the embodiment of this disclosure, by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

It should be noted that FIG. 9 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 9.

In some embodiments, whether the terminal equipment has sidelink data to be transmitted or uplink data to be transmitted may be distinguished by whether there exists sidelink-related information on the physical uplink data channel (PUSCH) in MSG.3 or MSG.A during the random access procedure, that is, the network device receives the uplink message transmitted by the terminal equipment on the physical uplink data channel (PUSCH), that is, the above MSG.3 or MSG.A is transmitted on the PUSCH, and the MSG.3 or MSG.A includes sidelink-related information; and the sidelink-related information is used to indicate that the terminal equipment has sidelink data to be transmitted. The above sidelink data may be a sidelink MAC CE, such as a channel state information reporting MAC CE; however, this embodiment is not limited thereto.

In some embodiments, the sidelink-related information is a sidelink buffer status report, which is used to indicate a logical channel group and/or a buffer size to which the sidelink data (such as the SL MAC CE) corresponds. In other words, the SL MAC CE may also trigger the sidelink buffer status report, the SL BSR being used to report an identifier (or index) of the logical channel group to which the sidelink MAC CE (such as the CSI reporting MAC CE) corresponds and corresponding buffer status information. For example, the identifier of the logical channel group to which the sidelink CSI reporting MAC CE corresponds is of a fixed value, such as 8, a corresponding buffer size is 1, and the terminal equipment carries the SL BSR by using MSG.3 or MSG.A of the random access procedure and transmits it to the network device. The network device may determine how much sidelink data needing to be transmitted that the terminal equipment has according to the SL BSR, that is, it may allocate corresponding sidelink resources to the terminal equipment.

In some embodiments, the sidelink-related information is a logical channel identifier (LCID) to which the sidelink data (e.g. the SL MAC CE) corresponds, for example, a value of which is one in 33-48. The terminal equipment may include the LCID in an MAC sub-header of an uplink MAC sub-protocol data unit (PDU). The terminal equipment carries the MAC sub-PDU by MSG.3 or MSG.A in the random access procedure and transmits it to the network device. According to the LCID, the network device may determine that the terminal equipment has sidelink data needing to be transmitted, that is, it may allocate corresponding sidelink resources to the terminal equipment.

In some embodiments, the sidelink-related information is a sidelink RNTI of the terminal equipment, and the terminal equipment carries the SL-RNTI by MSG.3 or MSG.A in the random access procedure, for example, it may transmit an SL-RNTI MAC CE with a predefined LCID to the network device, and according to the SL-RNTI, the network device may determine that the terminal equipment has sidelink data to be transmitted, that is, it may allocate corresponding sidelink resources to the terminal equipment.

In some embodiments, the uplink message may further include a C-RNTI of the terminal equipment, which is used for contention resolution of random access.

In some embodiments, the network device transmits the contention resolution message to the terminal equipment, i.e. MSG.4 or MSG.B. For example, the network device may scramble a physical downlink control channel scheduling MSG.4 or MSG.B by using the C-RNTI, and when the terminal equipment decodes a physical downlink control channel (PDCCH) addressing the C-RNTI of its own, it indicates that contention resolution is completed. The network device may allocate sidelink resources (i.e. carrying an SL grant) via a PDCCH addressing the SL-RNTI of terminal equipment, and the terminal equipment transmits the sidelink data by using the allocated sidelink resources.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner. For example, the embodiment of the second aspect may be combined with the embodiment of the sixth aspect, or may be used separately.

It can be seen from the above embodiment that by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

Embodiment of a Seventh Aspect

The embodiment of this disclosure provides a random access apparatus. The apparatus may be, for example, a terminal equipment (such as the above-described terminal equipment), or one or some components or assemblies configured in a terminal equipment, with contents identical to those in the embodiment of the fifth aspect being not going to be described herein any further.

Figure 10:
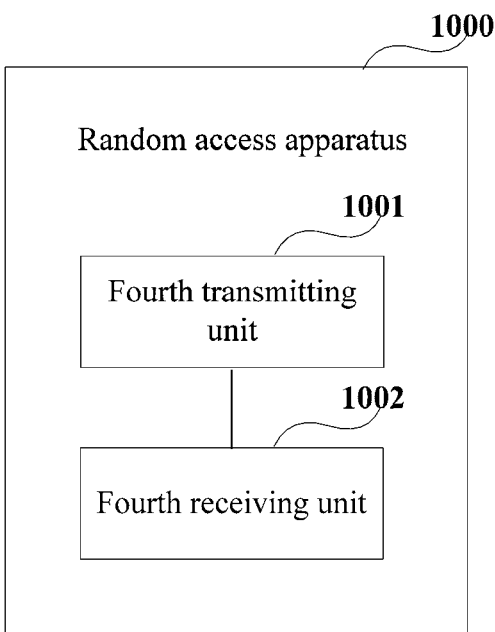
FIG. 10 is a schematic diagram of the random access apparatus of the seventh aspect of the embodiments of this disclosure.

FIG. 10 is a schematic diagram of the random access apparatus of the embodiment of this disclosure. In some embodiments, as shown in FIG. 10, a random access apparatus 1000 includes:

a fourth transmitting unit 1001 configured to transmit an uplink message to the network device at a physical uplink data channel in a random access procedure, the uplink message including sidelink-related information; and a fourth receiving unit 1002 configured to receive a contention resolution message transmitted by the network device.

According to the embodiment of this disclosure, by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

In some embodiments, whether the terminal equipment has sidelink data to be transmitted or uplink data to be transmitted may be distinguished by whether there exists sidelink-related information on the physical uplink data channel (PUSCH) in MSG.3 or MSG.A during the random access procedure, that is, the fourth transmitting unit 1001 transmits the uplink message to the network device on the physical uplink data channel (PUSCH), that is, the above MSG.3 or MSG.A is transmitted on the PUSCH, and the MSG.3 or MSG.A includes sidelink-related information; and the sidelink-related information is used to indicate that the terminal equipment has sidelink data to be transmitted. The above sidelink data may be a sidelink MAC CE, such as a channel state information reporting MAC CE; however, this embodiment is not limited thereto.

In some embodiments, the sidelink-related information is a sidelink buffer status report, which is used to indicate a logical channel group and/or a buffer size to which the sidelink data (such as the SL MAC CE) corresponds. In other words, the SL MAC CE may also trigger the sidelink buffer status report, the SL BSR being used to report an identifier (or index) of the logical channel group to which the sidelink MAC CE (such as the CSI reporting MAC CE) corresponds and corresponding buffer status information. For example, the identifier of the logical channel group to which the sidelink CSI reporting MAC CE corresponds is of a fixed value, such as 8, a corresponding buffer size is 1, and the terminal equipment carries the SL BSR by using MSG.3 or MSG.A of the random access procedure and transmits it to the network device. The network device may determine how much sidelink data needing to be transmitted that the terminal equipment has according to the SL BSR, that is, it may allocate corresponding sidelink resources to the terminal equipment.

In some embodiments, the sidelink-related information is a logical channel identifier (LCID) to which the sidelink data (e.g. the SL MAC CE) corresponds, for example, a value of which is one in 33-48. The terminal equipment may include the LCID in an MAC sub-header of an uplink MAC sub-protocol data unit (PDU). The terminal equipment carries the MAC sub-PDU by MSG.3 or MSG.A in the random access procedure and transmits it to the network device. According to the LCID, the network device may determine that the terminal equipment has sidelink data needing to be transmitted, that is, it may allocate corresponding sidelink resources to the terminal equipment.

In some embodiments, the sidelink-related information is a sidelink RNTI of the terminal equipment, and the terminal equipment carries the SL-RNTI by MSG.3 or MSG.A in the random access procedure, for example, it may transmit an SL-RNTI MAC CE with a predefined LCID to the network device, and according to the SL-RNTI, the network device may determine that the terminal equipment has sidelink data to be transmitted, that is, it may allocate corresponding sidelink resources to the terminal equipment.

In some embodiments, the uplink message may further include a C-RNTI of the terminal equipment, which is used for contention resolution of random access.

In some embodiments, the fourth receiving unit 1002 receives the contention resolution message transmitted by the network device, i.e. MSG.4 or MSG.B. For example, the network device may scramble a physical downlink control channel scheduling MSG.4 or MSG.B by using the C-RNTI, and when the terminal equipment decodes a physical downlink control channel (PDCCH) addressing the C-RNTI of its own, it indicates that contention resolution is completed. The network device may allocate sidelink resources (i.e. carrying an SL grant) via a PDCCH addressing the SL-RNTI of terminal equipment, and the terminal equipment transmits the sidelink data by using the allocated sidelink resources.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the random access apparatus 1000 may further include other components or modules, and reference may be made to the related techniques for specific contents of these components or modules.

Furthermore, for the sake of simplicity, connection relationships between the components or modules or signal profiles thereof are only illustrated in FIG. 10. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

It can be seen from the above embodiment that by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

Embodiment of an Eighth Aspect

The embodiment of this disclosure provides a random access apparatus. The apparatus may be, for example, a network device (such as the above-described network device), or one or some components or assemblies configured in a network device, with contents identical to those in the embodiment of the sixth aspect being not going to be described herein any further.

FIG. 11 is a schematic diagram of the random access apparatus of the embodiment of this disclosure. In some embodiments, as shown in FIG. 11, a random access apparatus 1100 includes:

a fifth receiving unit 1101 configured to receive an uplink message transmitted by the terminal equipment on the physical uplink data channel, the uplink message including sidelink-related information; and a fifth transmitting unit 1102 configured to transmit a contention resolution message to the terminal equipment.

According to the embodiment of this disclosure, by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

In some embodiments, whether the terminal equipment has sidelink data to be transmitted or uplink data to be transmitted may be distinguished by whether there exists sidelink-related information on the physical uplink data channel (PUSCH) in MSG.3 or MSG.A during the random access procedure, that is, the fifth receiving unit 1101 receives the uplink message transmitted by the terminal equipment on the physical uplink data channel (PUSCH), that is, the above MSG.3 or MSG.A is transmitted on the PUSCH, and the MSG.3 or MSG.A includes sidelink-related information; and the sidelink-related information is used to indicate that the terminal equipment has sidelink data to be transmitted. The above sidelink data may be a sidelink MAC CE, such as a channel state information reporting MAC CE; however, this embodiment is not limited thereto.

In some embodiments, the sidelink-related information is a sidelink buffer status report, which is used to indicate a logical channel group and/or a buffer size to which the sidelink data (such as the SL MAC CE) corresponds. In other words, the SL MAC CE may also trigger the sidelink buffer status report, the SL BSR being used to report an identifier (or index) of the logical channel group to which the sidelink MAC CE (such as the CSI reporting MAC CE) corresponds and corresponding buffer status information. For example, the identifier of the logical channel group to which the sidelink CSI reporting MAC CE corresponds is of a fixed value, such as 8, a corresponding buffer size is 1, and the terminal equipment carries the SL BSR by using MSG.3 or MSG.A of the random access procedure and transmits it to the network device. The network device may determine how much sidelink data needing to be transmitted that the terminal equipment has according to the SL BSR, that is, it may allocate corresponding sidelink resources to the terminal equipment.

In some embodiments, the sidelink-related information is a logical channel identifier (LCID) to which the sidelink data (e.g. the SL MAC CE) corresponds, for example, a value of which is one in 33-48. The terminal equipment may include the LCID in an MAC sub-header of an uplink MAC sub-protocol data unit (PDU). The terminal equipment carries the MAC sub-PDU by MSG.3 or MSG.A in the random access procedure and transmits it to the network device. According to the LCID, the network device may determine that the terminal equipment has sidelink data needing to be transmitted, that is, it may allocate corresponding sidelink resources to the terminal equipment.

In some embodiments, the sidelink-related information is a sidelink RNTI of the terminal equipment, and the terminal equipment carries the SL-RNTI by MSG.3 or MSG.A in the random access procedure, for example, it may transmit an SL-RNTI MAC CE with a predefined LCID to the network device, and according to the SL-RNTI, the network device may determine that the terminal equipment has sidelink data to be transmitted, that is, it may allocate corresponding sidelink resources to the terminal equipment.

In some embodiments, the uplink message may further include a C-RNTI of the terminal equipment, which is used for contention resolution of random access.

In some embodiments, the fifth transmitting unit 1102 transmits the contention resolution message to the terminal equipment, i.e. MSG.4 or MSG.B. For example, the network device may scramble a physical downlink control channel scheduling MSG.4 or MSG.B by using the C-RNTI, and when the terminal equipment decodes a physical downlink control channel (PDCCH) addressing the C-RNTI of its own, it indicates that contention resolution is completed. The network device may allocate sidelink resources (i.e. carrying an SL grant) via a PDCCH addressing the SL-RNTI of terminal equipment, and the terminal equipment transmits the sidelink data by using the allocated sidelink resources.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the random access apparatus 1100 may further include other components or modules, and reference may be made to the related techniques for specific contents of these components or modules.

Furthermore, for the sake of simplicity, connection relationships between the components or modules or signal profiles thereof are only illustrated in FIG. 11. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

It can be seen from the above embodiment that by indicating in the random access procedure to the network device that the terminal equipment has a sidelink MAC CE to be transmitted, it may be avoided that the network device does not learn that the terminal equipment has a sidelink MAC CE to be transmitted, so that the network device allocates resources for the sidelink, and resource consumption may be lowered.

In the embodiment of this disclosure, for the random access procedure where the SR triggered by the SL MAC CE is configured with no valid PUCCH resource or which is triggered when the maximum number times of transmission of the SR is reached, by always initiating an SR but not initiating the random access procedure, the network device may be avoided from not learning that the terminal equipment has a sidelink MAC CE to be transmitted, so that the network device may allocate resources for the sidelink, and resource consumption may be reduced. In addition, the method of not initiating the random access procedure may reduce occupation of radio resources by the random access procedure, thereby improving utilization of radio resources, which shall be described below with reference to the embodiments of a ninth to eighteenth aspects.

Embodiment of a Ninth Aspect

The embodiment of this disclosure provides a sidelink transmission method, which shall be described from a terminal equipment side. FIG. 12 is a schematic diagram of the sidelink transmission method of the embodiment of this disclosure. As shown in FIG. 12, the method includes:

> 1201: a terminal equipment receives, scheduling request configuration corresponding to sidelink data transmitted by a network device, the scheduling request configuration including a set of PUCCH resources on a bandwidth part (BWP);
>
> 1202: the terminal equipment triggers a scheduling request when the terminal equipment has sidelink data to be transmitted and there exists no currently available sidelink resource; and
>
> 1203: the terminal equipment transmits the scheduling request by using a PUCCH resource to which the scheduling request configuration corresponds.

According to the above embodiment, on the uplink bandwidth part (BWP) configured for the terminal equipment, the terminal equipment is configured with PUCCH resources belonging to the SR configuration. Therefore, in a case where a timing advance timer TimeAlignmentTimer does not expire, when the SR is triggered, the terminal equipment has the PUCCH resource to which the SR configuration corresponds in a currently active uplink BWP. Therefore, it is ensured that a random access procedure is not initiated because that the SR has no valid PUCCH resource, thereby reducing occupation of radio resources by a random access procedure and improving utilization of radio resources.

It should be noted that FIG. 12 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 12.

In some embodiments, the terminal equipment has sidelink data to be transmitted, and the sidelink data may be an SL MAC CE, such as an SL CSI reporting MAC CE. When there exists no currently available sidelink resource, the terminal equipment will trigger a scheduling request (SR), the SR being in a pending state, that is, the terminal equipment is ready for transmitting but has not transmitted an SR to the network device. The scheduling request is used by the terminal equipment to apply for resources from the network device for transmission of new sidelink data.

In some embodiments, the terminal equipment receives scheduling request configuration corresponding to the sidelink data and transmitted by the network device, the scheduling request configuration including a set of PUCCH resources for SR across each BWP in a cell. For example, the network device may transmit the SR configuration via an RRC reconfiguration message or system information or an RRC resume message or an RRC re-establishment message or an RRC setup message.

In some embodiments, the BWP includes an initial BWP of the terminal equipment and/or a BWP configured by the network for the terminal equipment (such as a BWP dedicated to the terminal equipment) via an RRC message (such as an RRC reconfiguration message or an RRC setup message).

In some embodiments, at most one PUCCH resource is configured on each BWP for an SR to which a sidelink data corresponds, such as a sidelink MAC CE.

In some embodiments, for sidelink data, the number of scheduling request configuration is one. For example, for a sidelink CSI reporting MAC CE, the network device configures only one scheduling request configuration.

In some embodiments, the terminal equipment transmits the SR by using the PUCCH resource in the scheduling request configuration to which the sidelink data corresponds, that is, transmitting the SR in a latest configured PUCCH resource after the SR is triggered.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that on the uplink bandwidth part (BWP) configured for the terminal equipment, the terminal equipment is configured with PUCCH resources belonging to the SR configuration. Therefore, in a case where a timing advance timer TimeAlignmentTimer does not expire, when the SR is triggered, the terminal equipment has the PUCCH resource to which the SR configuration corresponds in a currently active uplink BWP. Therefore, it is ensured that a random access procedure is not initiated because that the SR has no valid PUCCH resource, thereby reducing occupation of radio resources by a random access procedure and improving utilization of radio resources.

Embodiment of a Tenth Aspect

The embodiment of this disclosure provides a resource configuration method, which shall be described from a network device side, with contents identical to those in the embodiment of the ninth aspect being not going to be described herein any further.

FIG. 13 is a schematic diagram of the resource configuration method the embodiment of this disclosure. As shown in FIG. 13, the method includes:

1301: a network device transmits scheduling request configuration corresponding to sidelink data to a terminal equipment, the scheduling request configuration including a set of PUCCH resources on a BWP; and

1302: the network device receives, a scheduling request transmitted by the terminal equipment by using the PUCCH resource to which the scheduling request configuration corresponds.

According to the above embodiment, on the uplink bandwidth part (BWP) configured for the terminal equipment, the terminal equipment is configured with PUCCH resources belonging to the SR configuration. Therefore, in a case where a timing advance timer TimeAlignmentTimer does not expire, when the SR is triggered, the terminal equipment has the PUCCH resource to which the SR configuration corresponds in a currently active uplink BWP. Therefore, it is ensured that a random access procedure is not initiated because that the SR has no valid PUCCH resource, thereby reducing occupation of radio resources by a random access procedure and improving utilization of radio resources.

It should be noted that FIG. 13 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 13.

In some embodiments, the terminal equipment has sidelink data to be transmitted, and the sidelink data may be an SL MAC CE, such as an SL CSI reporting MAC CE. When there exists no currently available sidelink resource, the terminal equipment will trigger a scheduling request (SR), the SR being in a pending state, that is, the terminal equipment is ready for transmitting but has not transmitted an SR to the network device. The scheduling request is used by the terminal equipment to apply for resources from the network device for transmission of new sidelink data.

In some embodiments, the network device performs SR configuration, the scheduling request configuration including a set of PUCCH resources for SR across each BWP in a cell, and after the configuration is completed, the network device transmits the SR configuration to the terminal equipment. For example, the network device may transmit the SR configuration via an RRC reconfiguration message or system information or an RRC resume message or an RRC re-establishment message or an RRC setup message.

In some embodiments, the BWP includes an initial BWP of the terminal equipment and/or a BWP configured by the network for the terminal equipment (such as a BWP dedicated to the terminal equipment) via an RRC message (such as an RRC reconfiguration message or an RRC setup message).

In some embodiments, at most one PUCCH resource is configured on each BWP for an SR to which a sidelink data corresponds, such as a sidelink MAC CE.

In some embodiments, for sidelink data, the number of scheduling request configuration is one. For example, for a sidelink CSI reporting MAC CE, the network device configures only one scheduling request configuration.

In some embodiments, the network device receives the SR in the PUCCH resource in the scheduling request configuration to which the sidelink data corresponds, that is, allocating sidelink resources for the terminal equipment according to the SR.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that on the uplink bandwidth part (BWP) configured for the terminal equipment, the terminal equipment is configured with PUCCH resources belonging to the SR configuration. Therefore, in a case where a timing advance timer TimeAlignmentTimer does not expire, when the SR is triggered, the terminal equipment has the PUCCH resource to which the SR configuration corresponds in a currently active uplink BWP. Therefore, it is ensured that a random access procedure is not initiated because that the SR has no valid PUCCH resource, thereby reducing occupation of radio resources by a random access procedure and improving utilization of radio resources.

Embodiment of an Eleventh Aspect

The embodiment of this disclosure provides a random access method, which shall be described from a terminal equipment side. FIG. 14 is a schematic diagram of the random access method of the embodiment of this disclosure. As shown in FIG. 14, the method includes:

1401: a terminal equipment transmits a scheduling request to a network device; and

1402: when the number of times of transmission of the scheduling request reaches a predetermined maximum number of times of transmission, a random access procedure is not initiated, wherein the scheduling request is a scheduling request triggered when the terminal equipment has a sidelink MAC CE to be transmitted and there exists no currently available sidelink resource;

or, when the number of times of transmission of the scheduling request reaches a predetermined maximum number of times of transmission, a random access procedure is initiating, wherein the scheduling request is a scheduling request triggered by a non-sidelink MAC CE at the terminal equipment.

According to the above embodiment, the random access procedure is not initiated when the SR triggered by the SL MAC CE reaches the maximum number of times of transmission of the SR, or a random access procedure is initiated when the SR triggered by the non-SL MAC CE reaches the maximum number of times of transmission of the SR, which may avoid that the random access procedure is initiated because that the maximum number of times of transmission of the SR triggered by the SL MAC CE reaches the maximum number of times of transmission of the SR. As the network device does not learn via the random access procedure whether the terminal equipment applies for sidelink resources, the random access procedure is unable to be used to apply for sidelink resources from the network device, initiation of a random access procedure may be avoided, occupation of radio resources by a random access procedure may be reduced, and utilization of radio resources may be improved.

It should be noted that FIG. 14 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 14.

In some embodiments, the terminal equipment has a sidelink MAC CE to be transmitted, such as an SL CSI reporting MAC CE. When there exists no currently available sidelink resource, the terminal equipment will trigger a scheduling request (SR), which is in a pending state, that is, the terminal equipment is ready for transmitted an SR but has not transmitted an SR to the network device, the scheduling request being used by the terminal equipment to apply for resources from the network device for transmission of new sidelink data. Thereafter, when there exist valid PUCCH resources in the SR configuration to which the sidelink MAC CE corresponds, the terminal equipment transmits the SR by using a resource in the SR configuration; a prohibition timer sr-ProhibitTimer is provided to monitor the SR transmitted in the PUCCH. When the timer expires, the terminal equipment needs to re-transmit the SR, until the maximum number (sr-TransMax) of times of transmission is reached, and a random access procedure is not initiated after the maximum number of times of transmission is reached. In other words, when the SR is triggered by the sidelink MAC CE, a random access procedure is not initiated after the maximum number of times of transmission of the SR is reached.

In some embodiments, the terminal equipment has a non-SL MAC CE to be transmitted, such as uplink data or sidelink logical channel data, and when an uplink BSR or sidelink BSR is triggered and there exists no currently available uplink resource or an available uplink resource is unable to meet a certain requirement, the terminal equipment will trigger a scheduling request (SR), the SR is in pending state, that is, the terminal equipment is ready for transmitted an SR but has not transmitted an SR to the network device, the scheduling request being used by the terminal equipment to apply for resources from the network device for transmission of new data. Thereafter, when there are valid PUCCH resources in the SR configuration, the terminal equipment transmits the SR by using the resource in the SR configuration. A prohibition timer sr-ProhibitTimer is provided to monitor the SR transmitted in the PUCCH. When the timer expires, the terminal equipment needs to retransmit the SR, until the maximum number sr-TransMax of times of transmission is reached, and after the maximum number of times of transmission is reached, a random access procedure may be initiated. Furthermore, all uplink and downlink grants that have been configured may be cleared, and the RRC may be notified to release a PUCCH and a sounding reference signal SRS, etc. In other words, when the SR is not triggered by the sidelink MAC CE, a random access procedure may be initiated after the maximum number of times of transmission of the SR is reached.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the random access procedure is not initiated when the SR triggered by the SL MAC CE reaches the maximum number of times of transmission of the SR, or a random access procedure is initiated when the SR triggered by the non-SL MAC CE reaches the maximum number of times of transmission of the SR, which may avoid that the random access procedure is initiated because that the maximum number of times of transmission of the SR triggered by the SL MAC CE reaches the maximum number of times of transmission of the SR. As the network device does not learn via the random access procedure whether the terminal equipment applies for sidelink resources, the random access procedure is unable to be used to apply for sidelink resources from the network device, initiation of a random access procedure may be avoided, occupation of radio resources by a random access procedure may be reduced, and utilization of radio resources may be improved.

Embodiment of a Twelfth Aspect

Figure 15:
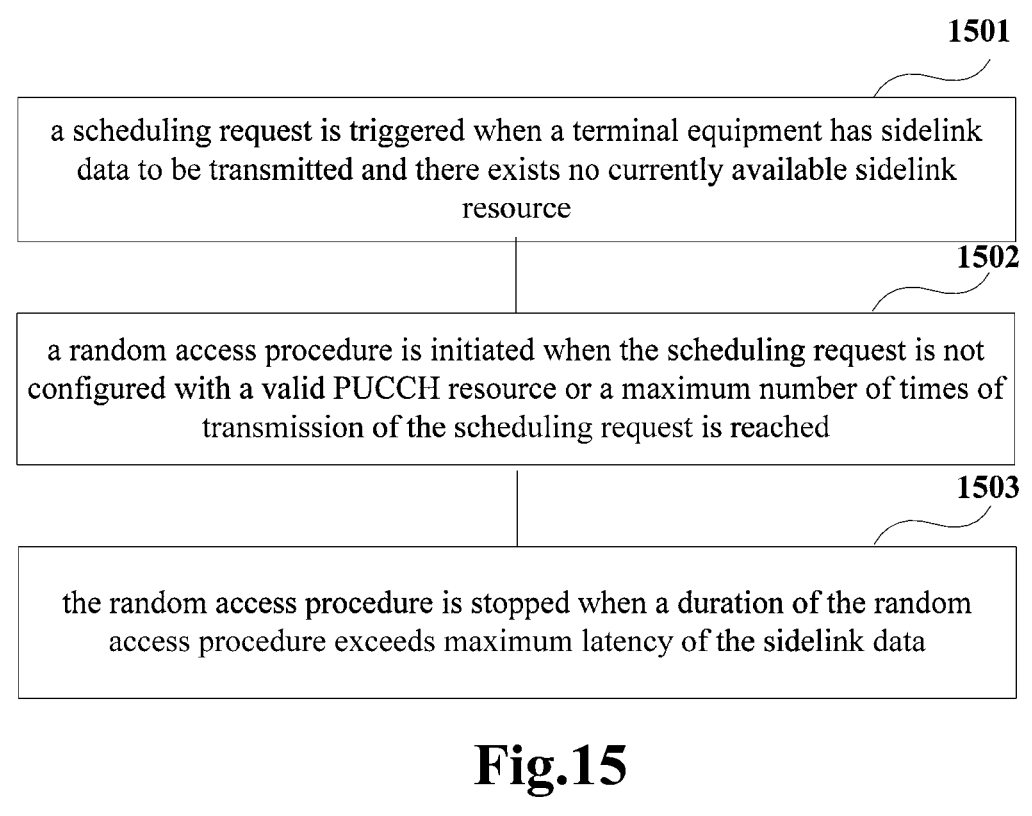

The embodiment of this disclosure provides a random access method, which shall described from a terminal equipment side. FIG. 15 is a schematic diagram of the random access method of embodiment of this disclosure. As shown in FIG. 15, the method includes:

1501: a scheduling request is triggered when a terminal equipment has sidelink data to be transmitted and there exists no currently available sidelink resource;

1502: a random access procedure is initiated when the scheduling request is not configured with a valid PUCCH resource or a maximum number of times of transmission of the scheduling request is reached; and

1503: the random access procedure is stopped when a duration of the random access procedure exceeds maximum latency of the sidelink data.

According to the above embodiment, for the case where the random access procedure is initiated because that the SR has no valid PUCCH resource or the maximum number of times of transmission of the SR is reached, when the duration of the random access procedure exceeds the maximum latency of the sidelink data, as the sidelink data has outdated and is of little use to a peer terminal equipment, the random access procedure is stopped, thereby reducing occupation of radio resources by the random access procedure and improving utilization of radio resources.

It should be noted that FIG. 15 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 15.

In some embodiments, the terminal equipment has sidelink data to be transmitted, and the sidelink data may be an SL MAC CE, such as an SL CSI reporting MAC CE, or sidelink logical channel data. When there exists no currently available sidelink resource, the terminal equipment will trigger a scheduling request (SR), the SR being in a pending state, that is, the terminal equipment is ready for transmitting but has not transmitted an SR to the network device. The scheduling request is used by the terminal equipment to apply for resources from the network device for transmission of new sidelink data.

In some embodiments, a random access procedure is initiated when the scheduling request is not configured with a valid PUCCH resource, and reference may be made to the embodiment of the first aspect for details of the random access procedure. The duration of the random access procedure is counted, and the random access procedure is stopped when the duration of the random access procedure exceeds the maximum latency of the sidelink data. The maximum latency of the sidelink data may be of a value between 4-20 ms.

In some embodiments, when there exists a valid PUCCH resource in the SR configuration, the terminal equipment transmits the SR by using a resource in the SR configuration. A prohibition timer sr-ProhibitTimer is provided to monitor the SR transmitted in the PUCCH. When the timer expires, the terminal equipment needs to retransmit the SR, until the maximum number sr-TransMax of times of transmission is reached, and after the maximum number of times of transmission is reached, a random access procedure is initiated. Reference may be made to the embodiment of the first aspect for details of the random access procedure. The duration of the random access procedure is counted, and the random access procedure is stopped when the duration of the random access procedure exceeds the maximum latency of the sidelink data. The maximum latency of the sidelink data may be of a value between 4-20 ms.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that for the case where the random access procedure is initiated because that the SR has no valid PUCCH resource or the maximum number of times of transmission of the SR is reached, when the duration of the random access procedure exceeds the maximum latency of the sidelink data, as the sidelink data has outdated and is of little use to a peer terminal equipment, the random access procedure is stopped, thereby reducing occupation of radio resources by the random access procedure and improving utilization of radio resources.

Embodiment of a Thirteenth Aspect

Figure 16:
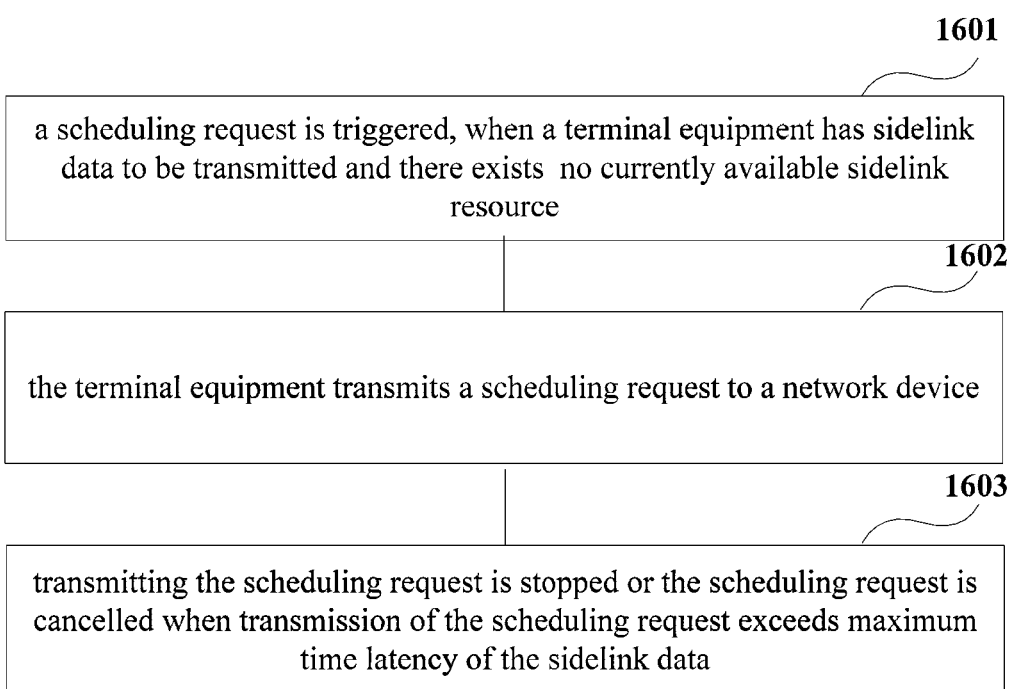
FIG. 16 is a schematic diagram of the scheduling request transmission method of the thirteenth aspect of the embodiments of this disclosure.

The embodiment of this disclosure provides a method for transmitting a scheduling request, which shall be described from a terminal equipment side. FIG. 16 is a schematic diagram of the method for transmitting a scheduling request of the embodiment of this disclosure. As shown in FIG. 16, the method includes:

1601: a scheduling request is triggered, when a terminal equipment has sidelink data to be transmitted and there exists no currently available sidelink resource;

1602: the terminal equipment transmits a scheduling request to a network device; and

1603: transmitting the scheduling request is stopped or the scheduling request is cancelled when transmission of the scheduling request exceeds maximum time latency of the sidelink data.

According to the above embodiment, when the transmission of the SR triggered by the sidelink data exceeds the maximum latency of the sidelink data, as the sidelink data has outdated and is of little use to a peer terminal equipment, transmission of the scheduling request is stopped or the scheduling request is cancelled, which may avoid initiation of a random access procedure, reduce occupation of uplink radio resources by the SR triggered by the SL MAC CE or use of sidelink resources allocated by the base station for transmission of outdated sidelink data, reduce resource consumption on a Uu interface and the sidelink, and improve utilization of radio resources.

It should be noted that FIG. 16 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 16.

In some embodiments, the terminal equipment has sidelink data to be transmitted, and the sidelink data may be an SL MAC CE, such as an SL CSI reporting MAC CE, or sidelink logical channel data. When there exists no currently available sidelink resource, the terminal equipment will trigger a scheduling request (SR), the SR being in a pending state, that is, the terminal equipment is ready for transmitting but has not transmitted an SR to the network device. The scheduling request is used by the terminal equipment to apply for resources from the network device for transmission of new sidelink data.

In some embodiments, when there exists a valid PUCCH resource in the SR configuration, the terminal equipment transmits the SR by using a resource in the SR configuration. A prohibition timer sr-ProhibitTimer is provided to monitor the SR transmitted in the PUCCH. When the timer expires, the terminal equipment needs to retransmit the SR. When the number of times of transmission of the SR (accumulative times of multiples times of transmission) exceeds the maximum latency of the sidelink data, transmission of the scheduling request is stopped or the scheduling request is cancelled, hence, a random access procedure will not be initiated. The maximum latency of the sidelink data may be of a value between 4-20 ms.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that when the transmission of the SR triggered by the sidelink data exceeds the maximum latency of the sidelink data, as the sidelink data has outdated and is of little use to a peer terminal equipment, transmission of the scheduling request is stopped or the scheduling request is cancelled, which may avoid initiation of a random access procedure, reduce occupation of uplink radio resources by the SR triggered by the SL MAC CE or use of sidelink resources allocated by the base station for transmission of outdated sidelink data, reduce resource consumption on a Uu interface and the sidelink, and improve utilization of radio resources.

Embodiment of a Fourteenth Aspect

The embodiment of this disclosure provides a sidelink transmission apparatus. The apparatus may be, for example, a terminal equipment (such as the above-described terminal equipment), or one or some components or assemblies configured in a terminal equipment, with contents identical to those in the embodiment of the ninth aspect being not going to be described herein any further.

Figure 17:
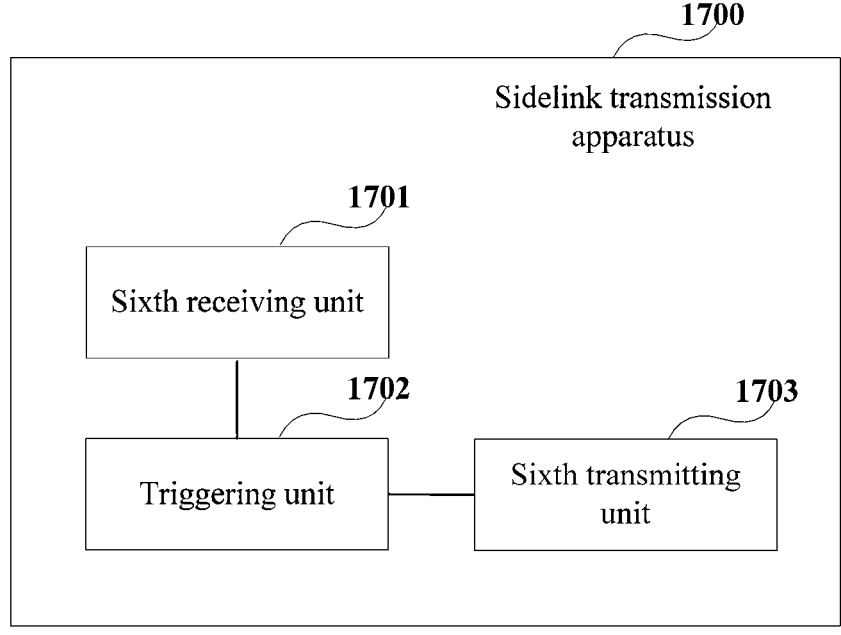
FIG. 17 is a schematic diagram of the sidelink transmission apparatus of the fourteenth aspect of the embodiments of this disclosure.

FIG. 17 is a schematic diagram of the sidelink transmission apparatus of the embodiment of this disclosure. In some embodiments, as shown in FIG. 17, a sidelink transmission apparatus 1700 includes:

a sixth receiving unit 1701 configured to receive scheduling request configuration corresponding to sidelink data transmitted by a network device, the scheduling request configuration including a set of PUCCH resources on a bandwidth part (BWP);

a triggering unit 1702 configured to trigger a scheduling request when the terminal equipment has sidelink data to be transmitted and there exists no currently available sidelink resource; and a sixth transmitting unit 1703 configured to transmit the scheduling request by using a PUCCH resource to which the scheduling request configuration corresponds.

According to the above embodiment, on the uplink bandwidth part (BWP) configured for the terminal equipment, the terminal equipment is configured with PUCCH resources belonging to the SR configuration. Therefore, in a case where a timing advance timer TimeAlignmentTimer does not expire, when the SR is triggered, the terminal equipment has the PUCCH resource to which the SR configuration corresponds in a currently active uplink BWP. Therefore, it is ensured that a random access procedure is not initiated because that the SR has no valid PUCCH resources, thereby reducing occupation of radio resources by a random access procedure and improving utilization of radio resources.

In some embodiments, the terminal equipment has sidelink data to be transmitted, and the sidelink data may be an SL MAC CE, such as an SL CSI reporting MAC CE. When there exists no currently available sidelink resource, the terminal equipment will trigger a scheduling request (SR), the SR being in a pending state, that is, the terminal equipment is ready for transmitting but has not transmitted an SR to the network device. The scheduling request is used by the terminal equipment to apply for resources from the network device for transmission of new sidelink data.

In some embodiments, the sixth receiving unit 1701 receives scheduling request configuration corresponding to the sidelink data and transmitted by the network device, the scheduling request configuration including a set of PUCCH resources for SR across each BWP in a cell. For example, the sixth receiving unit 1701 may receive the SR configuration via an RRC reconfiguration message or system information or an RRC resume message or an RRC re-establishment message or an RRC setup message.

In some embodiments, the BWP includes an initial BWP of the terminal equipment and/or a BWP configured by the network for the terminal equipment (such as a BWP dedicated to the terminal equipment) via an RRC message (such as an RRC reconfiguration message or an RRC setup message).

In some embodiments, at most one PUCCH resource is configured on each BWP for an SR to which a sidelink data corresponds, such as a sidelink MAC CE.

In some embodiments, for sidelink data, the number of scheduling request configuration is one. For example, for a sidelink CSI reporting MAC CE, the network device configures only one scheduling request configuration.

In some embodiments, the sixth transmitting unit 1703 transmits the SR by using the PUCCH resource in the scheduling request configuration to which the sidelink data corresponds, that is, transmitting the SR in a latest configured PUCCH resource after the SR is triggered.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the sidelink transmission apparatus 1700 may further include other components or modules, and reference may be made to the related techniques for specific contents of these components or modules.

Furthermore, for the sake of simplicity, connection relationships between the components or modules or signal profiles thereof are only illustrated in FIG. 17. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

It can be seen from the above embodiment that on the uplink bandwidth part (BWP) configured for the terminal equipment, the terminal equipment is configured with PUCCH resources belonging to the SR configuration. Therefore, in a case where a timing advance timer TimeAlignmentTimer does not expire, when the SR is triggered, the terminal equipment has the PUCCH resource to which the SR configuration corresponds in a currently active uplink BWP. Therefore, it is ensured that a random access procedure is not initiated because that the SR has no valid PUCCH resources, thereby reducing occupation of radio resources by a random access procedure and improving utilization of radio resources.

Embodiment of a Fifteenth Aspect

The embodiment of this disclosure provides a resource configuration apparatus. The apparatus may be, for example, a network device (such as the above-described network device), or one or some components or assemblies configured in a network device, with contents identical to those in the embodiment of the tenth aspect being not going to be described herein any further.

Figure 18:
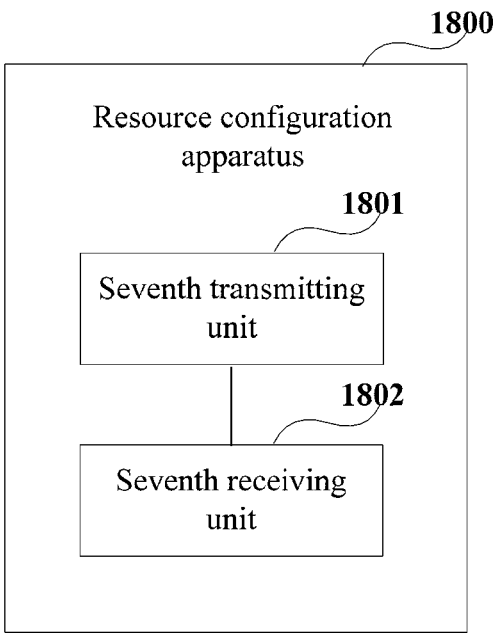
FIG. 18 is a schematic diagram of the resource configuration apparatus of the fifteenth aspect of the embodiments of this disclosure.

FIG. 18 is a schematic diagram of the resource configuration apparatus of the embodiment of this disclosure. In some embodiments, as shown in FIG. 18, a resource configuration apparatus 1800 includes:

a seventh transmitting unit 1801 configured to transmit scheduling request configuration corresponding to sidelink data to a terminal equipment, the scheduling request configuration including a set of PUCCH resources on a bandwidth part (BWP); and a seventh receiving unit 1802 configured to receive a scheduling request transmitted by the terminal equipment by using the PUCCH resource to which the scheduling request configuration corresponds.

According to the above embodiment, on the uplink bandwidth part (BWP) configured for the terminal equipment, the terminal equipment is configured with PUCCH resources belonging to the SR configuration. Therefore, in a case where a timing advance timer TimeAlignmentTimer does not expire, when the SR is triggered, the terminal equipment has the PUCCH resource to which the SR configuration corresponds in a currently active uplink BWP. Therefore, it is ensured that a random access procedure is not initiated because that the SR has no valid PUCCH resource, thereby reducing occupation of radio resources by a random access procedure and improving utilization of radio resources.

In some embodiments, the terminal equipment has sidelink data to be transmitted, and the sidelink data may be an SL MAC CE, such as an SL CSI reporting MAC CE. When there exists no currently available sidelink resource, the terminal equipment will trigger a scheduling request (SR), the SR being in a pending state, that is, the terminal equipment is ready for transmitting but has not transmitted an SR to the network device. The scheduling request is used by the terminal equipment to apply for resources from the network device for transmission of new sidelink data.

In some embodiments, the network device performs SR configuration, the scheduling request configuration including a set of PUCCH resources for SR across each BWP in a cell, and after the configuration is completed, the network device transmits the SR configuration to the terminal equipment. For example, the seventh transmitting unit 1801 may transmit the SR configuration via an RRC reconfiguration message or system information or an RRC resume message or an RRC re-establishment message or an RRC setup message.

In some embodiments, the BWP includes an initial BWP of the terminal equipment and/or a BWP configured by the network for the terminal equipment (such as a BWP dedicated to the terminal equipment) via an RRC message (such as an RRC reconfiguration message or an RRC setup message).

In some embodiments, at most one PUCCH resource is configured on each BWP for an SR to which a sidelink data corresponds, such as a sidelink MAC CE.

In some embodiments, for sidelink data, the number of scheduling request configuration is one. For example, for a sidelink CSI reporting MAC CE, the network device configures only one scheduling request configuration.

In some embodiments, the seventh receiving unit 1802 receives the SR in the PUCCH resource in the scheduling request configuration to which the sidelink data corresponds, and sidelink resources are allocated for the terminal equipment according to the SR.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the resource configuration apparatus 1800 may further include other components or modules, and reference may be made to the related techniques for specific contents of these components or modules.

Furthermore, for the sake of simplicity, connection relationships between the components or modules or signal profiles thereof are only illustrated in FIG. 18. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

It can be seen from the above embodiment that on the uplink bandwidth part (BWP) configured for the terminal equipment, the terminal equipment is configured with PUCCH resources belonging to the SR configuration. Therefore, in a case where a timing advance timer TimeAlignmentTimer does not expire, when the SR is triggered, the terminal equipment has the PUCCH resource to which the SR configuration corresponds in a currently active uplink BWP. Therefore, it is ensured that a random access procedure is not initiated because that the SR has no valid PUCCH resource, thereby reducing occupation of radio resources by a random access procedure and improving utilization of radio resources.

Embodiment of a Sixteenth Aspect

The embodiment of this disclosure provides a random access apparatus. The apparatus may be, for example, a terminal equipment (such as the above-described terminal equipment), or one or some components or assemblies configured in a terminal equipment, with contents identical to those in the embodiment of the eleventh aspect being not going to be described herein any further.

Figure 19:
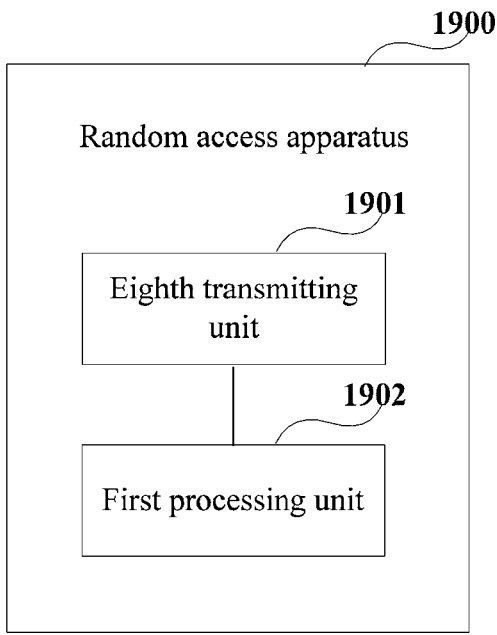
FIG. 19 is a schematic diagram of the random access apparatus of the sixteenth aspect of the embodiments of this disclosure.

FIG. 19 is a schematic diagram of the random access apparatus of the embodiment of this disclosure. In some embodiments, as shown in FIG. 19, a random access apparatus 1900 includes:

an eighth transmitting unit 1901 configured to transmit a scheduling request to a network device;

a first processing unit 1902 configured to, when the number of times of transmission of the scheduling request reaches a predetermined maximum number of times of transmission, not initiate a random access procedure, wherein the scheduling request is a scheduling request triggered when the terminal equipment has a sidelink MAC CE to be transmitted and there exists no currently available sidelink resource;

or, when the number of times of transmission of the scheduling request reaches a predetermined maximum number of times of transmission, initiate a random access procedure, wherein the scheduling request is a scheduling request triggered by a non-sidelink MAC CE at the terminal equipment.

According to the above embodiment, the random access procedure is not initiated when the SR triggered by the SL MAC CE reaches the maximum number of times of transmission of the SR, or a random access procedure is initiated when the SR triggered by the non-SL MAC CE reaches the maximum number of times of transmission of the SR, which may avoid that the random access procedure is initiated because that the maximum number of times of transmission of the SR triggered by the SL MAC CE reaches the maximum number of times of transmission of the SR. As the network device does not learn via the random access procedure whether the terminal equipment applies for sidelink resources, the random access procedure is unable to be used to apply for sidelink resources from the network device, initiation of a random access procedure may be avoided, occupation of radio resources by a random access procedure may be reduced, and utilization of radio resources may be improved.

In some embodiments, the terminal equipment has a sidelink MAC CE to be transmitted, such as an SL CSI reporting MAC CE. When there exists no currently available sidelink resource, the terminal equipment will trigger a scheduling request (SR), which is in a pending state, that is, the terminal equipment is ready for transmitted an SR but has not transmitted an SR to the network device, the scheduling request being used by the terminal equipment to apply for resources from the network device for transmission of new sidelink data. Thereafter, when there exist valid PUCCH resources in the SR configuration to which the sidelink MAC CE corresponds, the eighth transmitting unit 1901 transmits the SR by using a resource in the SR configuration; a prohibition timer sr-ProhibitTimer is provided to monitor the SR transmitted in the PUCCH. When the timer expires, the eighth transmitting unit 1901 needs to re-transmit the SR, until the maximum number (sr-Trans-Max) of times of transmission is reached, and the first processing unit 1902 does not initiate a random access procedure after the maximum number of times of transmission is reached. In other words, when the SR is triggered by the sidelink MAC CE, the first processing unit 1902 does not initiate a random access procedure after the maximum number of times of transmission of the SR is reached.

In some embodiments, the terminal equipment has a non-SL MAC CE to be transmitted, such as uplink data or sidelink logical channel data, and when an uplink BSR or sidelink BSR is triggered and there exists no currently available uplink resource, the terminal equipment will trigger a scheduling request (SR), the SR is in pending state, that is, the terminal equipment is ready for transmitted an SR but has not transmitted an SR to the network device, the scheduling request being used by the terminal equipment to apply for resources from the network device for transmission of new data. Thereafter, when there are valid PUCCH resources in the SR configuration, the eighth transmitting unit 1901 transmits the SR by using the resource in the SR configuration. A prohibition timer sr-ProhibitTimer is provided to monitor the SR transmitted in the PUCCH. When the timer expires, the eighth transmitting unit 1901 needs to retransmit the SR, until the maximum number sr-TransMax of times of transmission is reached, and after the maximum number of times of transmission is reached, the first processing unit 1902 may initiate a random access procedure. Furthermore, all uplink and downlink grants that have been configured may be cleared, and the RRC may be notified to release a PUCCH and a sounding reference signal SRS, etc. In other words, when the SR is not triggered by the sidelink MAC CE, the first processing unit 1902 may initiate a random access procedure after the maximum number of times of transmission of the SR is reached.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the random access apparatus 1900 may further include other components or modules, and reference may be made to the related techniques for specific contents of these components or modules.

Furthermore, for the sake of simplicity, connection relationships between the components or modules or signal profiles thereof are only illustrated in FIG. 19. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

It can be seen from the above embodiment that the random access procedure is not initiated when the SR triggered by the SL MAC CE reaches the maximum number of times of transmission of the SR, or a random access procedure is initiated when the SR triggered by the non-SL MAC CE reaches the maximum number of times of transmission of the SR, which may avoid that the random access procedure is initiated because that the maximum number of times of transmission of the SR triggered by the SL MAC CE reaches the maximum number of times of transmission of the SR. As the network device does not learn via the random access procedure whether the terminal equipment applies for sidelink resources, the random access procedure is unable to be used to apply for sidelink resources from the network device, initiation of a random access procedure may be avoided, occupation of radio resources by a random access procedure may be reduced, and utilization of radio resources may be improved.

Embodiment of a Seventeenth Aspect

The embodiment of this disclosure provides a scheduling request transmission apparatus. The apparatus may be, for example, a terminal equipment (such as the above-described terminal equipment), or one or some components or assemblies configured in a terminal equipment, with contents identical to those in the embodiment of the twelfth aspect being not going to be described herein any further.

Figure 20:
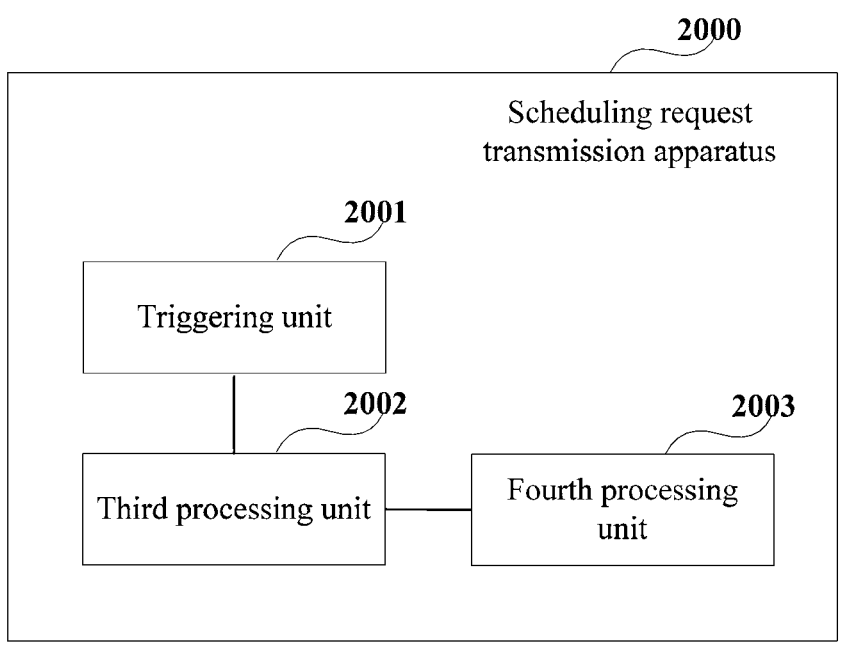
FIG. 20 is a schematic diagram of the random access apparatus of the seventeenth aspect of the embodiments of this disclosure.

FIG. 20 is a schematic diagram of the scheduling request transmission apparatus of the embodiment of this disclosure. In some embodiments, as shown in FIG. 20, a scheduling request transmission apparatus 2000 includes:

a triggering unit 2001 configured to trigger a scheduling request when a terminal equipment has sidelink data to be transmitted and there exists no currently available sidelink resource;

a third processing unit 2002 configured to initiate a random access procedure when the scheduling request is not configured with a valid PUCCH resource or a maximum number of times of transmission of the scheduling request is reached; and a fourth processing unit 2003 configured to stop the random access procedure when a duration of the random access procedure exceeds maximum latency of the sidelink data.

According to the above embodiment, for the case where the random access procedure is initiated because that the SR has no valid PUCCH resource or the maximum number of times of transmission of the SR is reached, when the duration of the random access procedure exceeds the maximum latency of the sidelink data, as the sidelink data has outdated and is of little use to a peer terminal equipment, the random access procedure is stopped, thereby reducing occupation of radio resources by the random access procedure and improving utilization of radio resources.

In some embodiments, the terminal equipment has sidelink data to be transmitted, and the sidelink data may be an SL MAC CE, such as an SL CSI reporting MAC CE, or sidelink logical channel data. When there exists no currently available sidelink resource, the triggering unit 2001 will trigger a scheduling request (SR), the SR being in a pending state, that is, the terminal equipment is ready for transmitting but has not transmitted an SR to the network device. The scheduling request is used by the terminal equipment to apply for resources from the network device for transmission of new sidelink data.

In some embodiments, the third processing unit 2002 initiates a random access procedure when the scheduling request is not configured with a valid PUCCH resource, and reference may be made to the embodiment of the first aspect for details of the random access procedure. The fourth processing unit 2003 counts the duration of the random access procedure, and the random access procedure is stopped when the duration of the random access procedure exceeds the maximum latency of the sidelink data. The maximum latency of the sidelink data may be of a value between 4-20 ms.

In some embodiments, when there exists a valid PUCCH resource in the SR configuration, the terminal equipment transmits the SR by using a resource in the SR configuration. A prohibition timer sr-ProhibitTimer is provided to monitor the SR transmitted in the PUCCH. When the timer expires, the terminal equipment needs to retransmit the SR, until the maximum number sr-TransMax of times of transmission is reached, and after the maximum number of times of transmission is reached, the third processing unit 2002 initiates a random access procedure. Reference may be made to the embodiment of the first aspect for details of the random access procedure. The fourth processing unit 2003 counts the duration of the random access procedure, and the random access procedure is stopped when the duration of the random access procedure exceeds the maximum latency of the sidelink data. The maximum latency of the sidelink data may be of a value between 4-20 ms.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the scheduling request transmission apparatus 2000 may further include other components or modules, and reference may be made to the related techniques for specific contents of these components or modules.

Furthermore, for the sake of simplicity, connection relationships between the components or modules or signal profiles thereof are only illustrated in FIG. 20. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

It can be seen from the above embodiment that for the case where the random access procedure is initiated because that the SR has no valid PUCCH resource or the maximum number of times of transmission of the SR is reached, when the duration of the random access procedure exceeds the maximum latency of the sidelink data, as the sidelink data has outdated and is of little use to a peer terminal equipment, the random access procedure is stopped, thereby reducing occupation of radio resources by the random access procedure and improving utilization of radio resources.

Embodiment of an Eighteenth Aspect

The embodiment of this disclosure provides a random access apparatus. The apparatus may be, for example, a terminal equipment (such as the above-described terminal equipment), or one or some components or assemblies configured in a terminal equipment, with contents identical to those in the embodiment of the thirteenth aspect being not going to be described herein any further.

Figure 21:
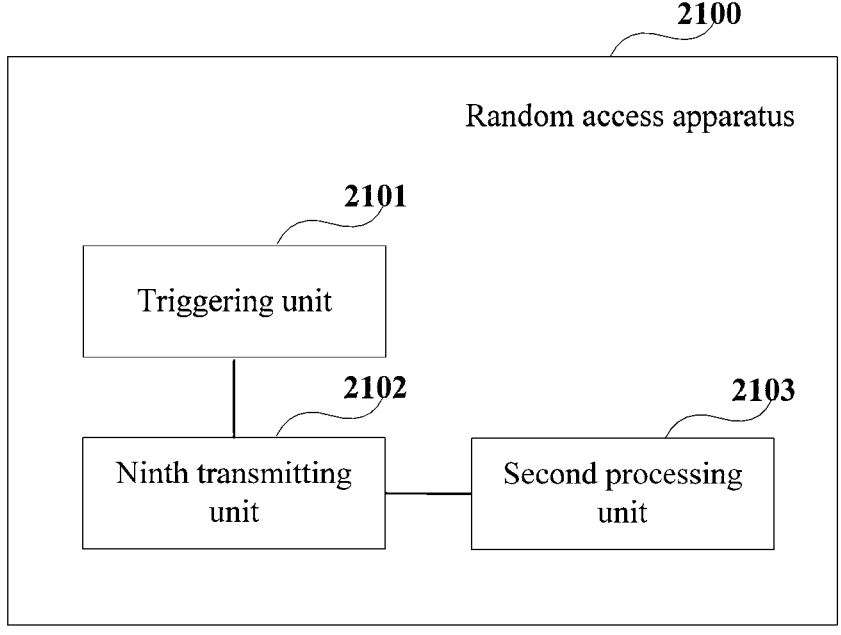
FIG. 21 is a schematic diagram of the scheduling request transmission apparatus of the eighteenth aspect of the embodiments of this disclosure.

FIG. 21 is a schematic diagram of the random access apparatus of the embodiment of this disclosure. In some embodiments, as shown in FIG. 21, a random access apparatus 2100 includes:

a triggering unit 2101 configured to trigger a scheduling request when a terminal equipment has sidelink data to be transmitted and there exists no currently available sidelink resource;

a ninth transmitting unit 2102 configured to transmit a scheduling request to a network device; and a second processing unit 2103 configured to stop transmitting the scheduling request or cancel the scheduling request when transmission of the scheduling request exceeds maximum time latency of the sidelink data.

According to the above embodiment, when the transmission of the SR triggered by the sidelink data exceeds the maximum latency of the sidelink data, as the sidelink data has outdated and is of little use to a peer terminal equipment, transmission of the scheduling request is stopped or the scheduling request is cancelled, which may avoid initiation of a random access procedure, reduce occupation of uplink radio resources by the SR triggered by the SL MAC CE or use of sidelink resources allocated by the base station for transmission of outdated sidelink data, reduce resource consumption on a Uu interface and the sidelink, and improve utilization of radio resources.

In some embodiments, the terminal equipment has sidelink data to be transmitted, and the sidelink data may be an SL MAC CE, such as an SL CSI reporting MAC CE, or sidelink logical channel data. When there exists no currently available sidelink resource, the triggering unit 2101 will trigger a scheduling request (SR), the SR being in a pending state, that is, the terminal equipment is ready for transmitting but has not transmitted an SR to the network device. The scheduling request is used by the terminal equipment to apply for resources from the network device for transmission of new sidelink data.

In some embodiments, when there exists a valid PUCCH resource in the SR configuration, the ninth transmitting unit 2102 transmits the SR by using a resource in the SR configuration. A prohibition timer sr-ProhibitTimer is provided to monitor the SR transmitted in the PUCCH. When the timer expires, the ninth transmitting unit 2102 needs to retransmit the SR. When the number of times of transmission of the SR (accumulative times of multiples times of transmission) exceeds the maximum latency of the sidelink data, the second processing unit 2103 stops transmitting the scheduling request or cancels the scheduling request, hence, a random access procedure will not be initiated. The maximum latency of the sidelink data may be of a value between 4-20 ms.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the random access apparatus 2100 may further include other components or modules, and reference may be made to the related techniques for specific contents of these components or modules.

Furthermore, for the sake of simplicity, connection relationships between the components or modules or signal profiles thereof are only illustrated in FIG. 21. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

It can be seen from the above embodiment that when the transmission of the SR triggered by the sidelink data exceeds the maximum latency of the sidelink data, as the sidelink data has outdated and is of little use to a peer terminal equipment, transmission of the scheduling request is stopped or the scheduling request is cancelled, which may avoid initiation of a random access procedure, reduce occupation of uplink radio resources by the SR triggered by the SL MAC CE or use of sidelink resources allocated by the base station for transmission of outdated sidelink data, reduce resource consumption on a Uu interface and the sidelink, and improve utilization of radio resources.

Embodiment of a Nineteenth Aspect

The embodiment of this disclosure provides a communication system, and reference may be made to FIG. 1, with contents identical to those in the embodiments of the first to the eighteenth aspects being not going to be described herein any further.

The embodiment of this disclosure further provides a network device, which may be, for example, a base station. However, this disclosure is not limited thereto, and it may also be another network device.

Figure 22:
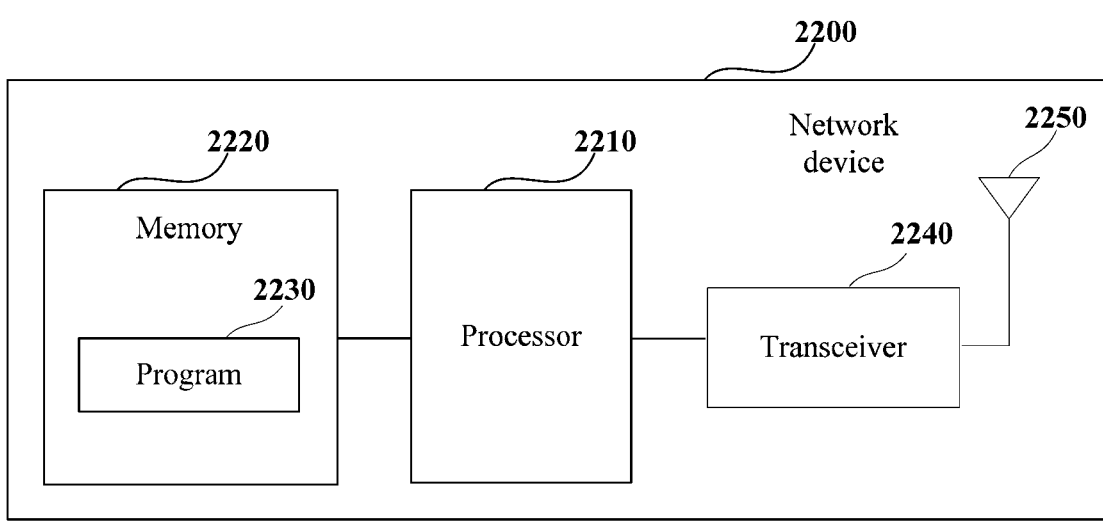
FIG. 22 is a schematic diagram of the terminal equipment of the nineteenth aspect of the embodiments of this disclosure.

FIG. 22 is a schematic diagram of a structure of the network device of the embodiment of this disclosure. As shown in FIG. 22, a network device 2200 may include a processor 2210 (such as a central processing unit (CPU)) and a memory 2220, the memory 2220 being coupled to the processor 2210. The memory 2220 may store various data, and furthermore, it may store a program 2230 for data processing, and execute the program 2230 under control of the processor 2210.

For example, the processor 2210 may be configured to execute the program to carry out the random access method as described in the embodiment of the second aspect. For example, the processor 2210 may be configured to execute the following control: receiving, on a physical random access channel resource, a random access preamble transmitted by a terminal equipment; wherein the random access preamble is used to indicate that the terminal equipment has sidelink data to be transmitted, and/or the physical random access channel resource is used to indicate that the terminal equipment has sidelink data to be transmitted; and transmitting a random access response to the terminal equipment.

For example, the processor 2210 may be configured to execute the program to carry out the random access method as described in the embodiment of the sixth aspect. For example, the processor 2210 may be configured to execute the following control: receiving an uplink message transmitted by a terminal equipment at a physical uplink data channel, the uplink message including sidelink-related information; and transmitting a contention resolution message to the terminal equipment.

For example, the processor 2210 may be configured to execute the program to carry out the resource configuration method as described in the embodiment of the tenth aspect. For example, the processor 2210 may be configured to execute the following control: transmitting scheduling request configuration corresponding to sidelink data to a terminal equipment, the scheduling request configuration including a set of PUCCH resources on a BWP; and receiving the scheduling request transmitted by the terminal equipment by using the PUCCH resource to which the scheduling request configuration corresponds.

Furthermore, as shown in FIG. 22, the network device 2200 may include a transceiver 2240, and an antenna 2250, etc. Functions of the above components are similar to those in the related art, and shall not be described herein any further. It should be noted that the network device 2200 does not necessarily include all the parts shown in FIG. 22, and furthermore, the network device 2200 may include parts not shown in FIG. 22, and the related art may be referred to.

The embodiment of this disclosure further provides a terminal equipment; however, this disclosure is not limited thereto, and it may also be another equipment.

Figure 23:
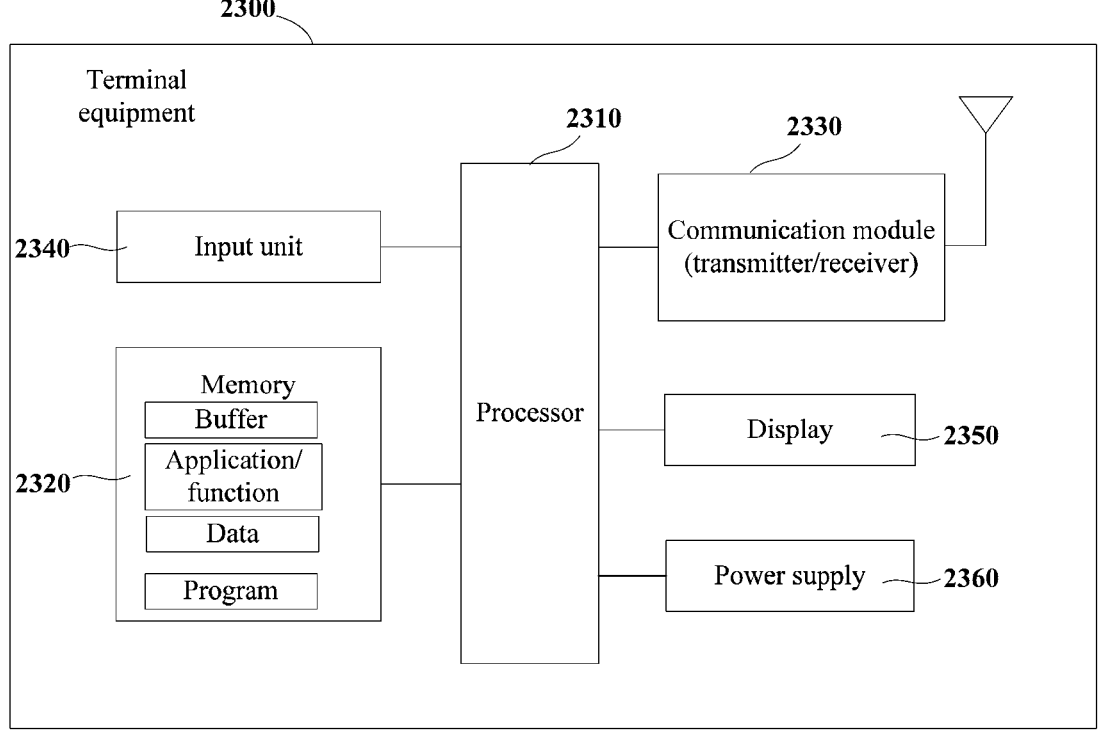
FIG. 23 is a schematic diagram of the network device of the twentieth aspect of the embodiments of this disclosure.

FIG. 23 is a schematic diagram of the terminal equipment of the embodiment of this disclosure. As shown in FIG. 23, a terminal equipment 2300 may include a processor 2310 and a memory 2320, the memory 2320 storing data and a program and being coupled to the processor 2310. It should be noted that this figure is illustrative only, and other types of structures may also be used, so as to supplement or replace this structure and achieve a telecommunications function or other functions.

For example, the processor 2310 may be configured to execute a program to carry out the random access method as described in the embodiment of the first aspect. For example, the processor 2310 may be configured to perform the following control: selecting a random access preamble; and transmitting the random access preamble to a network device on the physical random access channel resource; wherein the random access preamble is used to indicate that the terminal equipment has sidelink data to be transmitted, and/or the physical random access preamble is used to indicate that the terminal equipment has sidelink data to be transmitted.

For example, the processor 2310 may be configured to execute a program to carry out the random access method as described in the embodiment of the fifth aspect. For example, the processor 2310 may be configured to perform the following control: transmitting an uplink message to a network device at a physical uplink data channel in a random access procedure, the uplink message including sidelink-related information; and receiving a contention resolution message transmitted by the network device.

For example, the processor 2310 may be configured to execute a program to carry out the uplink transmission method as described in the embodiment of the ninth aspect. For example, the processor 2310 may be configured to perform the following control: receiving scheduling request configuration corresponding to sidelink data transmitted by a network device, the scheduling request configuration including a set of PUCCH resources on a bandwidth part (BWP); triggering a scheduling request when the terminal equipment has sidelink data to be transmitted and there exists no currently available sidelink resource; and transmitting the scheduling request by using a PUCCH resource to which the scheduling request configuration corresponds.

For example, the processor 2310 may be configured to execute a program to carry out the random access method as described in the embodiment of the eleventh aspect. For example, the processor 2310 may be configured to perform the following control: transmitting a scheduling request to a network device; and when the number of times of transmission of the scheduling request reaches a predetermined maximum number of times of transmission, not initiating a random access procedure, wherein the scheduling request is a scheduling request triggered when the terminal equipment has a sidelink MAC CE to be transmitted and there exists no currently available sidelink resource; or, when the number of times of transmission of the scheduling request reaches a predetermined maximum number of times of transmission, initiating a random access procedure, wherein the scheduling request is a scheduling request triggered by a non-sidelink MAC CE at the terminal equipment.

For example, the processor 2310 may be configured to execute a program to carry out the scheduling request transmission method as described in the embodiment of the twelfth aspect. For example, the processor 2310 may be configured to perform the following control: triggering a scheduling request when a terminal equipment has sidelink data to be transmitted and there exists no currently available sidelink resource; transmitting a scheduling request to a network device; and stopping transmitting the scheduling request or cancelling the scheduling request when transmission of the scheduling request exceeds maximum time latency of the sidelink data.

For example, the processor 2310 may be configured to execute a program to carry out the random access method as described in the embodiment of the thirteenth aspect. For example, the processor 2310 may be configured to perform the following control: triggering a scheduling request when a terminal equipment has sidelink data to be transmitted and there exists no currently available sidelink resource; initiating a random access procedure when the scheduling request is not configured with a valid PUCCH resource or a maximum number of times of transmission of the scheduling request is reached; and stopping the random access procedure when a duration of the random access procedure exceeds maximum latency of the sidelink data.

As shown in FIG. 23, the terminal equipment 2300 may further include a communication module 2330, an input unit 2340, a display 2350, and a power supply 2360; wherein functions of the above components are similar to those in the related art, which shall not be described herein any further. It should be noted that the terminal equipment 2300 does not necessarily include all the parts shown in FIG. 23, and the above components are not necessary. Furthermore, the terminal equipment 2300 may include parts not shown in FIG. 23, and the related art may be referred to.

An embodiment of this disclosure provides a computer readable program, which, when executed in a terminal equipment, will cause the terminal equipment to carry out the random access methods as described in the embodiments of the first, fifth, eleventh and thirteenth aspects.

An embodiment of this disclosure provides a computer readable program, which, when executed in a network device, will cause the network device to carry out the random access methods as described in the embodiments of the second and sixth aspects.

An embodiment of this disclosure provides a computer readable program, which, when executed in a terminal equipment, will cause the terminal equipment to carry out the sidelink transmission method as described in the embodiment of the ninth aspect.

An embodiment of this disclosure provides a computer readable program, which, when executed in a network device, will cause the network device to carry out the resource configuration method as described in the embodiment of the tenth aspect.

An embodiment of this disclosure provides a computer readable program, which, when executed in a terminal equipment, will cause the terminal equipment to carry out the scheduling request transmission method as described in the embodiment of the twelfth aspect.

An embodiment of this disclosure provides a computer storage medium, including a computer readable program, which will cause a terminal equipment to carry out the random access methods as described in the embodiments of the first, fifth, eleventh and thirteenth aspects.

An embodiment of this disclosure provides a computer storage medium, including a computer readable program, which will cause a terminal equipment to carry out the sidelink transmission methods as described in the embodiment of the ninth aspect.

An embodiment of this disclosure provides a computer storage medium, including a computer readable program, which will cause a terminal equipment to carry out the scheduling request transmission method as described in the embodiment of the twelfth aspect.

An embodiment of this disclosure provides a computer storage medium, including a computer readable program, which will cause a network device to carry out the random access methods as described in the embodiments of the second and sixth aspects.

An embodiment of this disclosure provides a computer storage medium, including a computer readable program, which will cause a network device to carry out the resource configuration method as described in the embodiment of the tenth aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention.

As to implementations containing the above embodiments, following supplements are further disclosed.

Supplement 1. A random access method, applicable to a terminal equipment side, wherein the method includes:

selecting a random access preamble by the terminal equipment;

transmitting the random access preamble to a network device by the terminal equipment on a physical random access channel resource; wherein the random access preamble is used to indicate that the terminal equipment has sidelink data to be transmitted, and/or the physical random access channel resource is used to indicate that the terminal equipment has sidelink data to be transmitted.

Supplement 2. The method according to supplement 1, wherein the method further includes:

receiving, by the terminal equipment, a random access response transmitted by the network device, the random access response including a sidelink grant.

Supplement 3. The method according to supplement 2, wherein a reserved bit in the random access response is used to indicate the sidelink grant.

Supplement 4. The method according to supplement 2 or 3, wherein the random access response does not include a timing advance control field and a temporary C-RNTI field.

Supplement 5. The method according to any one of supplements 1-4, wherein the sidelink data is a sidelink MAC CE.

Supplement 6. The method according to any one of supplements 1-5, wherein the method further includes:

receiving, by the terminal equipment, the random access preamble set and/or the physical random access channel resource set configured by the network device.

Supplement 7. The method according to supplement 6, wherein the random access preamble set and/or the physical random access channel resource set is/are received via a radio resource control (RRC) reconfiguration message or system information or an RRC resume message or an RRC re-establishment message or an RRC setup message.

Supplement 8. A random access method, applicable to a network device side, wherein the method includes:

receiving, by a network device on a physical random access channel resource, a random access preamble transmitted by a terminal equipment; wherein the random access preamble is used to indicate that the terminal equipment has sidelink data to be transmitted, and/or the physical random access channel resource is used to indicate that the terminal equipment has sidelink data to be transmitted; and transmitting a random access response by the network device to the terminal equipment.

Supplement 9. The method according to supplement 8, wherein the random access response includes a sidelink grant.

Supplement 10. The method according to supplement 9, wherein a reserved bit in the random access response is used to indicate the sidelink grant.

Supplement 11. The method according to supplement 9 or 10, wherein the random access response does not include a timing advance control field and a temporary C-RNTI field.

Supplement 12. The method according to any one of supplements 8-11, wherein the sidelink data is a sidelink MAC CE.

Supplement 13. The method according to supplement 5 or 12, wherein the sidelink MAC CE is a sidelink CSI reporting MAC CE.

Supplement 14. The method according to any one of supplements 8-13, wherein the method further includes:

configuring the random access preamble set and/or the physical random access channel resource set by the network device; and transmitting the configured random access preamble set and/or physical random access channel resource set by the network device to the terminal equipment.

Supplement 15. The method according to supplement 14, wherein the random access preamble set and/or the physical random access channel resource set is/are transmitted via a radio resource control (RRC) reconfiguration message or system information or an RRC resume message or an RRC re-establishment message or an RRC setup message.

Supplement 16. A random access method, applicable to a terminal equipment side, wherein the method includes:

transmitting an uplink message by a terminal equipment to a network device at a physical uplink data channel in a random access procedure, the uplink message including sidelink-related information; and receiving, by the terminal equipment, a contention resolution message transmitted by the network device.

Supplement 17. A random access method, applicable to a network device side, wherein the method includes:

receiving by a network device an uplink message transmitted by a terminal equipment on a physical uplink data channel, the uplink message including sidelink-related information; and transmitting a contention resolution message by the network device to the terminal equipment.

Supplement 18. The method according to supplement 16 or 17, wherein the sidelink-related information is a sidelink buffer status report or a logical channel identifier (LCID) to which the sidelink data corresponds or a sidelink RNTI of the terminal equipment.

Supplement 19. The method according to any one of supplements 15-18, wherein the sidelink-related information is used to indicate that the terminal equipment has sidelink data to be transmitted.

Supplement 20. The method according to any one of supplements 15-19, wherein the uplink message further includes a C-RNTI of the terminal equipment.

Supplement 21. The method according to any one of supplements 15-20, wherein the sidelink data is a sidelink MAC CE.

Supplement 22. The method according to supplement 21, wherein the sidelink MAC CE is a sidelink CSI reporting MAC CE.

Supplement 23. The method according to supplement 18, wherein the sidelink buffer status report indicates a logical channel group and/or a buffer size to which the sidelink MAC CE corresponds.

Supplement 24. A sidelink transmission method, applicable to a terminal equipment side, wherein the method includes:

receiving by a terminal equipment scheduling request configuration corresponding to sidelink data transmitted by a network device, the scheduling request configuration including a set of PUCCH resources on a bandwidth part (BWP);

triggering a scheduling request when the terminal equipment has sidelink data to be transmitted and there exists no sidelink resource that is currently available; and transmitting the scheduling request by the terminal equipment by using a PUCCH resource to which the scheduling request configuration corresponds.

Supplement 25. A resource configuration method, applicable to a network device side, the method including:

transmitting scheduling request configuration corresponding to sidelink data by a network device to a terminal equipment, the scheduling request configuration including a set of PUCCH resources on a bandwidth part (BWP); and receiving, by the network device, the scheduling request transmitted by the terminal equipment by using the PUCCH resource to which the scheduling request configuration corresponds.

Supplement 26. The method according to supplement 24 or 25, wherein the number of the scheduling request configuration is one.

Supplement 27. The method according to any one of supplements 24-26, wherein the scheduling request configuration includes a set of PUCCH resources on each BWP.

Supplement 28. The method according to any one of supplements 24-27, wherein in one scheduling request configuration, at most one PUCCH resource is configured on each BWP.

Supplement 29. The method according to any one of supplements 24-28, wherein the scheduling request configuration is transmitted via a radio resource control (RRC) reconfiguration message or system information or an RRC resume message or an RRC re-establishment message or an RRC setup message.

Supplement 30. The method according to any one of supplements 24-29, wherein the sidelink data is a sidelink MAC CE.

Supplement 31. The method according to supplement 30, wherein the sidelink MAC CE is a sidelink CSI reporting MAC CE.

Supplement 32. A random access method, applicable to a network device side, wherein the method includes:

transmitting a scheduling request by a terminal equipment to a network device; and not initiating a random access procedure by the terminal equipment when the number of transmitted scheduling requests reaches a predetermined maximum number of times of transmission; wherein the scheduling request is a scheduling request triggered when the terminal equipment has a sidelink MAC CE to be transmitted and there exists no currently available sidelink resource;

or, initiating a random access procedure by the terminal equipment when the number of transmitted scheduling requests reaches a predetermined maximum number of times of transmission; wherein the scheduling request is a scheduling request triggered by non-sidelink MAC CEs at the terminal equipment.

Supplement 33. The method according to supplement 32, wherein the sidelink MAC CE is a sidelink CSI reporting MAC CE.

Supplement 34. A scheduling request transmission method, applicable to a terminal equipment side, wherein the method includes:

triggering a scheduling request when a terminal equipment has sidelink data to be transmitted and there exists no currently available sidelink resource;

transmitting a scheduling request by the terminal equipment to a network device; and stopping transmitting the scheduling request or cancelling the scheduling request by the terminal equipment when transmission of the scheduling request exceeds maximum latency of the sidelink data.

Supplement 35. A random access method, applicable to a terminal equipment side, wherein the method includes:

triggering a scheduling request when a terminal equipment has sidelink data to be transmitted and there exists no currently available sidelink resource;

initiating a random access procedure by the terminal equipment when the scheduling request is not configured with a valid PUCCH resource or transmission of the scheduling request reaches a maximum number of times of transmission; and stopping the random access procedure by the terminal equipment when a duration of the random access procedure exceeds maximum latency of the sidelink data.

Supplement 36. The method according to any one of supplements 34-35, wherein the sidelink data is a sidelink MAC CE or a sidelink logical channel data.

Supplement 37. The method according to supplement 36, wherein the sidelink MAC CE is a sidelink CSI reporting MAC CE.

Supplement 38. A random access apparatus, applicable to a terminal equipment side, wherein the apparatus includes:

a selecting unit configured to select a random access preamble; and a first transmitting unit configured to transmit the random access preamble to a network device on a physical random access channel resource; wherein the random access preamble is used to indicate that the terminal equipment has sidelink data to be transmitted, and/or the physical random access channel resource is used to indicate that the terminal equipment has sidelink data to be transmitted.

Supplement 39. The apparatus according to supplement 38, wherein the apparatus further includes:

a first receiving unit configured to receive a random access response transmitted by the network device, the random access response including a sidelink grant.

Supplement 40. The apparatus according to supplement 39, wherein a reserved bit in the random access response is used to indicate the sidelink grant.

Supplement 41. The apparatus according to supplement 39 or 40, wherein the random access response does not include a timing advance control field and a temporary C-RNTI field.

Supplement 42. The apparatus according to any one of supplements 39-41, wherein the sidelink data is a sidelink MAC CE.

Supplement 43. The apparatus according to any one of supplements 39-42, wherein the apparatus further includes:

a second receiving unit configured to receive the random access preamble set and/or the physical random access channel resource set configured by the network device.

Supplement 44. The apparatus according to supplement 43, wherein the second receiving unit receives the random access preamble set and/or the physical random access channel resource set via a radio resource control (RRC) reconfiguration message or system information or an RRC resume message or an RRC re-establishment message or an RRC setup message.

Supplement 45. A random access apparatus, applicable to a network device side, wherein the apparatus includes:

a third receiving unit configured to receive, on a physical random access channel resource, a random access preamble transmitted by a terminal equipment; wherein the random access preamble is used to indicate that the terminal equipment has sidelink data to be transmitted, and/or the physical random access channel resource is used to indicate that the terminal equipment has sidelink data to be transmitted; and a second transmitting unit configured to transmit a random access response to the terminal equipment.

Supplement 46. The apparatus according to supplement 45, wherein the random access response includes a sidelink grant.

Supplement 47. The apparatus according to supplement 46, wherein a reserved bit in the random access response is used to indicate the sidelink grant.

Supplement 48. The apparatus according to supplement 46 or 47, wherein the random access response does not include a timing advance control field and a temporary C-RNTI field.

Supplement 49. The apparatus according to any one of supplements 45-48, wherein the sidelink data is a sidelink MAC CE.

Supplement 50. The apparatus according to supplement 49, wherein the sidelink MAC CE is a sidelink CSI reporting MAC CE.

Supplement 51. The apparatus according to any one of supplements 45-50, wherein the apparatus further includes:

a configuring unit configured to configure the random access preamble set and/or the physical random access channel resource set; and a third transmitting unit configured to transmit the configured random access preamble set and/or physical random access channel resource set to the terminal equipment.

Supplement 52. The apparatus according to supplement 51, wherein the third transmitting unit transmits the random access preamble set and/or the physical random access channel resource set via a radio resource control (RRC) reconfiguration message or system information or an RRC resume message or an RRC re-establishment message or an RRC setup message.

Supplement 53. A random access apparatus, applicable to a terminal equipment side, wherein the apparatus includes:

a fourth transmitting unit configured to transmit an uplink message to a network device at a physical uplink data channel in a random access procedure, the uplink message including sidelink-related information; and a fourth receiving unit configured to receive a contention resolution message transmitted by the network device.

Supplement 54. A random access apparatus, applicable to a network device side, wherein the apparatus includes:
a fifth receiving unit configured to receive an uplink message transmitted by a terminal equipment on a physical uplink data channel, the uplink message including sidelink-related information; and
a fifth transmitting unit configured to transmit a contention resolution message to the terminal equipment.

Supplement 55. The apparatus according to supplement 53 or 54, wherein the sidelink-related information is a sidelink buffer status report or a logical channel identifier (LCID) to which the sidelink data corresponds or a sidelink RNTI of the terminal equipment.

Supplement 56. The apparatus according to any one of supplements 53-55, wherein the sidelink-related information is used to indicate that the terminal equipment has sidelink data to be transmitted.

Supplement 57. The apparatus according to any one of supplements 53-56, wherein the uplink message further includes a C-RNTI of the terminal equipment.

Supplement 58. The apparatus according to any one of supplements 53-57, wherein the sidelink data is a sidelink MAC CE.

Supplement 59. The apparatus according to supplement 58, wherein the sidelink MAC CE is a sidelink CSI reporting MAC CE.

Supplement 60. The apparatus according to supplement 55, wherein the sidelink buffer status report indicates a logical channel group and/or a buffer size to which the sidelink MAC CE corresponds.

Supplement 61. A sidelink transmission apparatus, applicable to a terminal equipment side, wherein the apparatus includes:
a sixth receiving unit configured to receive scheduling request configuration corresponding to sidelink data transmitted by a network device, the scheduling request configuration including a set of PUCCH resources on a bandwidth part (BWP);
a triggering unit configured to trigger a scheduling request when the terminal equipment has sidelink data to be transmitted and there exists no sidelink resource that is currently available; and
a sixth transmitting unit configured to transmit the scheduling request by using a PUCCH resource to which the scheduling request configuration corresponds.

Supplement 62. A resource configuration apparatus, applicable to a network device side, the apparatus including:
a seventh transmitting unit configured to transmit scheduling request configuration corresponding to sidelink data to a terminal equipment, the scheduling request configuration including a set of PUCCH resources on a bandwidth part (BWP); and
a seventh receiving unit configured to receive a scheduling request transmitted by the terminal equipment by using the PUCCH resource to which the scheduling request configuration corresponds.

Supplement 63. The apparatus according to supplement 61 or 62, wherein the number of the scheduling request configuration is one.

Supplement 64. The apparatus according to any one of supplements 61-63, wherein the scheduling request configuration includes a set of PUCCH resources on each BWP.

Supplement 65. The apparatus according to any one of supplements 61-64, wherein in one scheduling request configuration, at most one PUCCH resource is configured on each BWP.

Supplement 66. The apparatus according to any one of supplements 61-65, wherein the seventh transmitting unit transmits the scheduling request configuration via a radio resource control (RRC) reconfiguration message or system information or an RRC resume message or an RRC re-establishment message or an RRC setup message.

Supplement 67. The apparatus according to any one of supplements 61-66, wherein the sidelink data is a sidelink MAC CE.

Supplement 68. The apparatus according to supplement 67, wherein the sidelink MAC CE is a sidelink CSI reporting MAC CE.

Supplement 69. A random access apparatus, applicable to a terminal equipment, wherein the apparatus includes:
an eighth transmitting unit configured to transmit a scheduling request to a network device; and
a first processing unit configured to not to initiate a random access procedure when the number of transmitted scheduling requests reaches a predetermined maximum number of times of transmission; wherein the scheduling request is a scheduling request triggered when the terminal equipment has a sidelink MAC CE to be transmitted and there exists no currently available sidelink resource;
or,
initiate a random access procedure when the number of transmitted scheduling requests reaches a predetermined maximum number of times of transmission; wherein the scheduling request is a scheduling request triggered by non-sidelink MAC CEs at the terminal equipment.

Supplement 70. The apparatus according to supplement 69, wherein the sidelink MAC CE is a sidelink CSI reporting MAC CE.

Supplement 71. A scheduling request transmission apparatus, applicable to a terminal equipment, wherein the apparatus includes:
a triggering unit configured to trigger a scheduling request when a terminal equipment has sidelink data to be transmitted and there exists no currently available sidelink resource;
a ninth transmitting unit configured to transmit a scheduling request to a network device; and
a second processing unit configured to stop transmitting the scheduling request or cancel the scheduling request when transmission of the scheduling request exceeds maximum latency of the sidelink data.

Supplement 72. A random access apparatus, applicable to a terminal equipment, wherein the apparatus includes:
a triggering unit configured to trigger a scheduling request when a terminal equipment has sidelink data to be transmitted and there exists no currently available sidelink resource;
a third processing unit configured to initiate a random access procedure when the scheduling request is not configured with a valid PUCCH resource or transmission of the scheduling request reaches a maximum number of times of transmission; and
a fourth processing unit configured to stop the random access procedure when a duration of the random access procedure exceeds maximum latency of the sidelink data.

Supplement 73. The apparatus according to either one of supplements 71-72, wherein the sidelink data is a sidelink MAC CE or a sidelink logical channel data.

Supplement 74. The apparatus according to supplement 73, wherein the sidelink MAC CE is a sidelink CSI reporting MAC CE.

Supplement 75. A terminal equipment, including a memory and a processor, the memory storing a computer program, and the processor being configured to execute the computer program to carry out the method as described in any one of supplements 1-7, 16, 18-24 and 26-37.

Supplement 76. A network device, including a memory and a processor, the memory storing a computer program, and the processor being configured to execute the computer program to carry out the data transmission method as described in any one of supplements 8-15, 17-23 and 25-31.

Supplement 77. A communication system, including the terminal equipment as described in supplement 75.

Supplement 78. A communication system, including the network device as described in supplement 76.

What is claimed is:

1. A scheduling request transmission apparatus, applicable to a terminal equipment side, wherein the apparatus comprises:

a memory; and processor circuitry coupled to the memory and configured to:

trigger a scheduling request when the terminal equipment has sidelink CSI reporting to be transmitted and there exists no currently available sidelink resource;

transmit a scheduling request to a network device; and cancel the scheduling request when the sidelink CSI reporting is outdated, wherein the sidelink CSI reporting is outdated when maximum latency of the sicelink CSI reporting is exceeded, wherein, when there exists a valid PUCCH resource in a scheduling request configuration, the processor circuitry is further configured to transmit the scheduling request by using the PUCCH resource in the scheduling request configuration, and wherein, the processor circuitry is further configured to receive scheduling request configuration corresponding to the sidelink CSI reporting transmitted by the network device via an RRC reconfiguration message, and at most one PUCCH resource is configured per bandwidth part for the scheduling request to which the sidelink CSI reporting corresponds.

2. The apparatus according to claim 1, wherein the maximum latency of the sidelink data is exceeded when the transmission of the scheduling request exceeds the maximum latency of the sidelink data.

3. The apparatus according to claim 1, wherein the scheduling request is a pending scheduling request when the scheduling request is triggered.

4. The apparatus according to claim 1, wherein the maximum latency of the sidelink data is 4 to 20 milliseconds.

5. A scheduling request reception apparatus, applicable to a network equipment side, wherein the apparatus comprises:

a memory; and processor circuitry coupled to the memory and configured to:

receive a scheduling request transmitted by a terminal equipment after the scheduling request is triggered when the terminal equipment has sidelink CSI reporting to be transmitted and there exists no currently available sidelink resource; and fail in receiving the scheduling request transmitted by the terminal equipment when the sidelink CSI reporting is outdated, wherein the sidelink CSI reporting is outdated when maximum latency of the sidelink CSI reporting is exceeded, and wherein, when there exists a valid PUCCH resource in a scheduling request configuration, the processor circuitry is further configured to receive the scheduling request by using the PUCCH resource in the scheduling request configuration, wherein, the processor circuitry is further configured to transmit scheduling request configuration corresponding to the sidelink CSI reporting via an RRC reconfiguration message, and at most one PUCCH resource is configured per bandwidth part for the scheduling request to which the sidelink CSI reporting corresponds.

6. The apparatus according to claim 5, wherein the maximum latency of the sidelink data is exceeded when the transmission of the scheduling request exceeds the maximum latency of the sidelink data.

7. The apparatus according to claim 5, wherein the scheduling request is a pending scheduling request when the scheduling request is triggered.

8. The apparatus according to claim 5, wherein the maximum latency of the sidelink data is 4 to 20 milliseconds.

* * * * *